United States Patent
Ikeda et al.

(10) Patent No.: US 12,442,513 B2
(45) Date of Patent: Oct. 14, 2025

(54) LIGHTING DEVICE WITH LIQUID CRYSTAL PANELS

(71) Applicant: Japan Display Inc., Tokyo (JP)

(72) Inventors: Kojiro Ikeda, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/753,362

(22) Filed: Jun. 25, 2024

(65) Prior Publication Data
US 2024/0344685 A1    Oct. 17, 2024

Related U.S. Application Data

(63) Continuation of application No. PCT/JP2022/043044, filed on Nov. 21, 2022.

(30) Foreign Application Priority Data

Jan. 13, 2022    (JP) ................................. 2022-003964

(51) Int. Cl.
*F21V 14/00*    (2018.01)
*G02F 1/1337*    (2006.01)
(Continued)

(52) U.S. Cl.
CPC .......... *F21V 14/003* (2013.01); *G02F 1/1337* (2013.01); *G02F 1/134309* (2013.01); *G02F 1/1347* (2013.01)

(58) Field of Classification Search
CPC .................. F21V 14/003; G02F 1/1337; G02F 1/134309; G02F 1/1347
See application file for complete search history.

(56) References Cited

U.S. PATENT DOCUMENTS

| | | |
|---|---|---|
| 2016/0077402 A1 | 3/2016 | Takehara et al. |
| 2018/0196318 A1* | 7/2018 | Presniakov ....... G02F 1/134363 |
| | | (Continued) |

FOREIGN PATENT DOCUMENTS

| | | |
|---|---|---|
| JP | 2010-230887 A | 10/2010 |
| JP | 2016-057541 A | 4/2016 |
| | (Continued) | |

OTHER PUBLICATIONS

Koito et al, WO2021157225A1, machine translation Aug. 2021 (Year: 2021).*

(Continued)

*Primary Examiner* — Tracie Y Green
(74) *Attorney, Agent, or Firm* — K&L Gates LLP

(57) ABSTRACT

Disclosed is a lighting device including a light source, a first liquid crystal panel over the light source, and a second liquid crystal panel over the first liquid crystal panel. Each of the first liquid crystal panel and the second liquid crystal panel includes: a substrate; a plurality of lower electrodes arranged over the substrate in a stripe shape; a first orientation film over the plurality of lower electrodes; a liquid crystal layer over the first orientation film; a second orientation film arranged over the liquid crystal layer and having an orientation direction orthogonal to that of the first orientation film; a plurality of upper electrodes arranged over the second orientation film, orthogonal to the plurality of lower electrodes, and arranged in a stripe shape; and a counter substrate over the plurality of upper electrodes.

20 Claims, 20 Drawing Sheets

(51) Int. Cl.
     *G02F 1/1343*    (2006.01)
     *G02F 1/1347*    (2006.01)

(56) References Cited

U.S. PATENT DOCUMENTS

| | | | |
|---|---|---|---|
| 2020/0050076 A1 | 2/2020 | Galstian et al. | |
| 2022/0357614 A1* | 11/2022 | Koito | G02F 1/1343 |
| 2022/0373831 A1 | 11/2022 | Koito et al. | |
| 2025/0035991 A1* | 1/2025 | Ikeda | G02F 1/1347 |

FOREIGN PATENT DOCUMENTS

| | | |
|---|---|---|
| JP | 2019-169435 A | 10/2019 |
| WO | WO2021/157225 A1 | 8/2021 |

OTHER PUBLICATIONS

English translation of Office Action issued in related Japanese Patent Application No. 2023-573874, mailed on Nov. 5, 2024. 4 pages.
Search Report issued in related International Patent Application No. PCT/JP2022/043044 mailed on Feb. 14, 2023 and English translation of same. 5 pages.
Written Opinion issued in related International Patent Application No. PCT/JP2022/043044 mailed on Feb. 14, 2023. 4 pages.

\* cited by examiner

100

LIGHTING DEVICE WITH LIQUID CRYSTAL PANELS

CROSS-REFERENCE TO RELATED APPLICATIONS

This application is a Continuation of International Patent Application No. PCT/JP2022/043044, filed on Nov. 21, 2022, which claims the benefit of priority to Japanese Patent Application No. 2022-003964, filed on Jan. 13, 2022, the entire contents of which are incorporated herein by reference.

FIELD

An embodiment of the present invention relates to a lighting device. For example, an embodiment of the present invention relates to a lighting device capable of arbitrarily controlling an irradiation area.

BACKGROUND

In recent years, lighting devices capable of controlling an irradiation area and an irradiation distance of a light source by controlling the light emitted from the light source using a liquid crystal lens have been developed. For example, the lighting devices disclosed in Japanese Patent Application Publications No. 2010-230887, 2016-057541, and 2019-169435 each include a liquid crystal panel with electrodes sandwiching a liquid crystal layer as well as a light source overlapping the liquid crystal panel. In these lighting devices, the orientation of the liquid crystal molecules in the liquid crystal layer is controlled by the electric field between the electrodes, allowing the liquid crystal panel to function as a lens, thereby controlling the light distribution.

SUMMARY

An embodiment of the present invention is a lighting device. The lighting device includes a light source, a first liquid crystal panel over the light source, and a second liquid crystal panel over the first liquid crystal panel. Each of the first liquid crystal panel and the second liquid crystal panel includes: a substrate; a plurality of lower electrodes arranged over the substrate in a stripe shape; a first orientation film over the plurality of lower electrodes; a liquid crystal layer over the first orientation film; a second orientation film arranged over the liquid crystal layer and having an orientation direction orthogonal to that of the first orientation film; a plurality of upper electrodes arranged over the second orientation film, orthogonal to the plurality of lower electrodes, and arranged in a stripe shape; and a counter substrate over the plurality of upper electrodes. A first angle between an extending direction of the plurality of lower electrodes of the first liquid crystal panel and an extending direction of the plurality of lower electrodes of the second liquid crystal panel is equal to or greater than 0° and equal to or less than 5°. With respect to sequentially arranged first to third lower electrodes arbitrarily selected from the plurality of lower electrodes in each of the first liquid crystal panel and the second liquid crystal panel, a spacing between the first lower electrode and the second lower electrode is different from a spacing between the second lower electrode and the third lower electrode. In a similar way, with respect to sequentially arranged first to third upper electrodes arbitrarily selected from the plurality of upper electrodes in each of the first liquid crystal panel and the second liquid crystal panel, a spacing between the first upper electrode and the second upper electrode is different from a spacing between the second upper electrode and the third upper electrode.

An embodiment of the present invention is a lighting device. The lighting device includes a light source and first to fourth liquid crystal panels sequentially stacked over the light source. Each of the first liquid crystal panel and the second liquid crystal panel includes: a substrate; a plurality of lower electrodes arranged over the substrate in a stripe shape; a first orientation film arranged over the plurality of lower electrodes; a liquid crystal layer over the first orientation film; a second orientation film arranged over the liquid crystal layer and having an orientation direction orthogonal to that of the first orientation film; and a counter substrate over the second orientation film. Each of the third liquid crystal panel and the fourth liquid crystal panel includes: a substrate; a first orientation film over the substrate; a liquid crystal layer over the first orientation film; a second orientation film arranged over the liquid crystal layer and having an orientation direction orthogonal to that of the first orientation film; a plurality of upper electrodes arranged over the second orientation film in a stripe shape; and a counter substrate over the plurality of upper electrodes. Extending directions of the plurality of lower electrodes of the first liquid crystal panel and the second liquid crystal panel are orthogonal to extending directions of the plurality of upper electrodes of the third liquid crystal panel and the fourth liquid crystal panel. With respect to sequentially arranged first to third lower electrodes arbitrarily selected from the plurality of lower electrodes in each of the first liquid crystal panel and the second liquid crystal panel, a spacing between the first lower electrode and the second lower electrode is different from a spacing between the second lower electrode and the third lower electrode. With respect to sequentially arranged first to third upper electrodes arbitrarily selected from the plurality of upper electrodes in each of the third liquid crystal panel and the fourth liquid crystal panel, a spacing between the first upper electrode and the second upper electrode is different from a spacing between the second upper electrode and the third upper electrode.

An embodiment of the present invention is a lighting device. The lighting device includes a light source and first to fourth liquid crystal panels sequentially stacked over the light source. Each of the first liquid crystal panel and the second liquid crystal panel includes: a substrate; a first orientation film arranged over the substrate; a liquid crystal layer arranged over the first orientation film; a second orientation film arranged over the liquid crystal layer and having an orientation direction orthogonal to that of the first orientation film; a plurality of upper electrodes arranged over the second orientation film in a stripe shape; and a counter substrate over the plurality of upper electrodes. Each of the third liquid crystal panel and the fourth liquid crystal panel includes; a substrate; a plurality of lower electrodes arranged over the substrate in a stripe shape; a first orientation film arranged over the plurality of lower electrodes; a liquid crystal layer arranged over the first orientation film; a second orientation film arranged over the liquid crystal layer and having an orientation direction orthogonal to that of the first orientation film; and a counter substrate over the second orientation film. Extending directions of the plurality of upper electrodes of the first liquid crystal panel and the second liquid crystal panel are orthogonal to extending directions of the plurality of lower electrodes of the third liquid crystal panel and the fourth liquid crystal panel. With respect to sequentially arranged first to third upper electrodes arbitrarily selected from the plurality of upper electrodes in each of the first liquid crystal panel and the second liquid crystal panel, a spacing between the first upper electrode and the second upper electrode is different from a spacing between the second upper electrode and the third upper electrode. With respect to sequentially arranged first to third lower electrodes arbitrarily selected from the plurality of lower electrodes in each of the third liquid crystal panel and the fourth liquid crystal panel, a spacing between the first lower electrode and the second lower electrode is different from a spacing between the second lower electrode and the third lower electrode.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate. When a plurality of the same or similar structures is collectively represented, a reference number is used, while a hyphen and a natural number follow the reference number when the structures are independently represented.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression that two structures are "orthogonal to each other" includes not only a state where these two structures are orthogonal (90°) but also a state where these two structures intersect at an angle of 90°±10°. Similarly, an expression that two structures are "parallel to each other" includes not only a state where an angle between the extending directions of these two structures is 0° but also a state where the angle is 0°±10°.

First Embodiment

In the present embodiment, a lighting device 100 according to an embodiment of the present invention is explained.

Figure 1A:
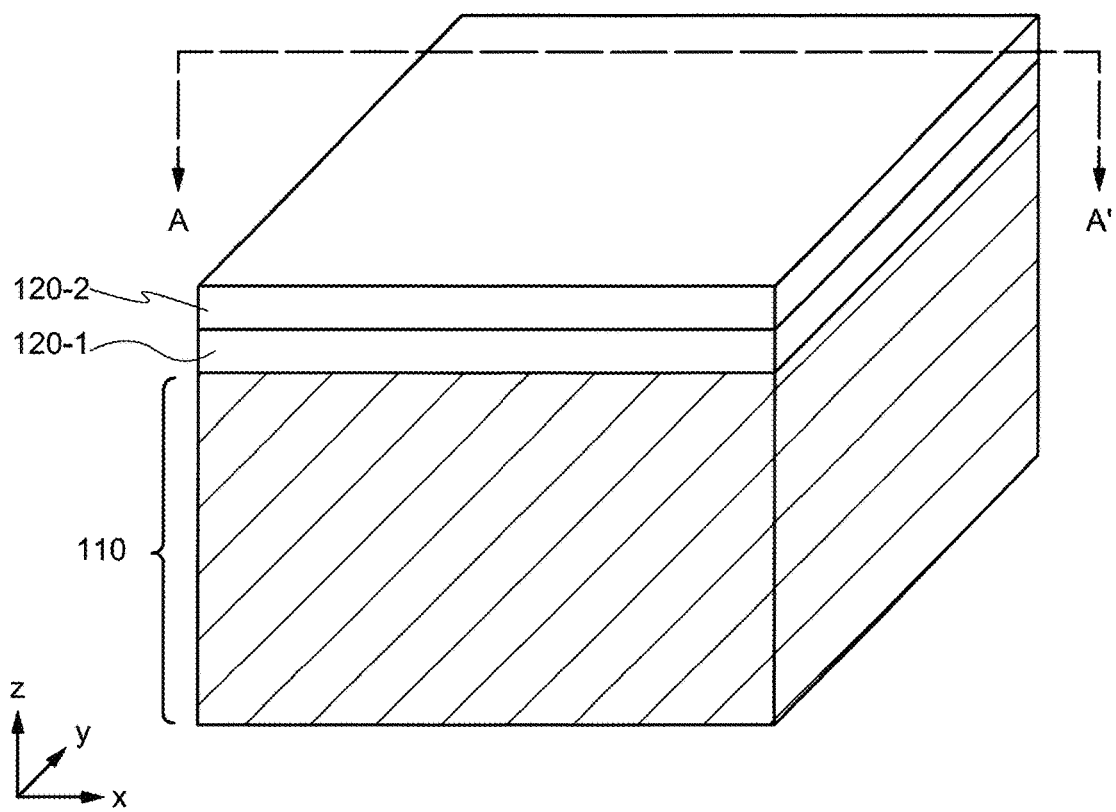
FIG. 1A is a schematic perspective view of a lighting device according to an embodiment of the present invention.

FIG. 1A demonstrates a schematic perspective view of the lighting device 100. As shown in FIG. 1A, the lighting device 100 has, as fundamental components thereof, a light source 110 and two optical elements overlapping the light source 110 and provided over the light source 110. One of the optical elements is a first liquid crystal panel 120-1 over the light source 110, while the other is a second liquid crystal panel 120-2 disposed over the first liquid crystal panel 120-1. The first liquid crystal panel 120-1 and the second liquid crystal panel 120-2 may be in direct contact with each other or may be fixed to each other using an adhesive or the like which is not illustrated. In the following drawings including FIG. 1A, the main surfaces of the first liquid crystal panel 120-1 and the second liquid crystal panel 120-2 are defined as a xy plane, and the direction orthogonal to this plane is defined as a z-direction for convenience. The x Direction and y direction are orthogonal to each other, but the angle between the x direction and the y direction is in the range of 90°±10° according to the definition described above. For example, the x direction and the y direction are parallel to the sides of the substrate 122 or the counter substrate 124 described below. Hereinafter, each component is described in detail.

1. Light Source

The light source 110 is configured to irradiate the first liquid crystal panel 120-1 and the second liquid crystal panel 120-2 with highly directional collimated light. Specifically, as shown in the schematic cross-sectional view along the chain line A-A' in FIG. 1A (FIG. 2B), the light source 110 has a reflector 112 having a depressed portion 112a and one or a plurality of light-emitting elements 114 provided within the depressed portion 112a. There is no restriction on the shape of the reflector 112 in the xy plane and may be appropriately set according to the environment in which the lighting device 100 is installed. For example, the shape of the reflector 112 in the xy plane may be a square or may be a circle, an ellipse, or a polygon, although not illustrated.

Figure 1B:
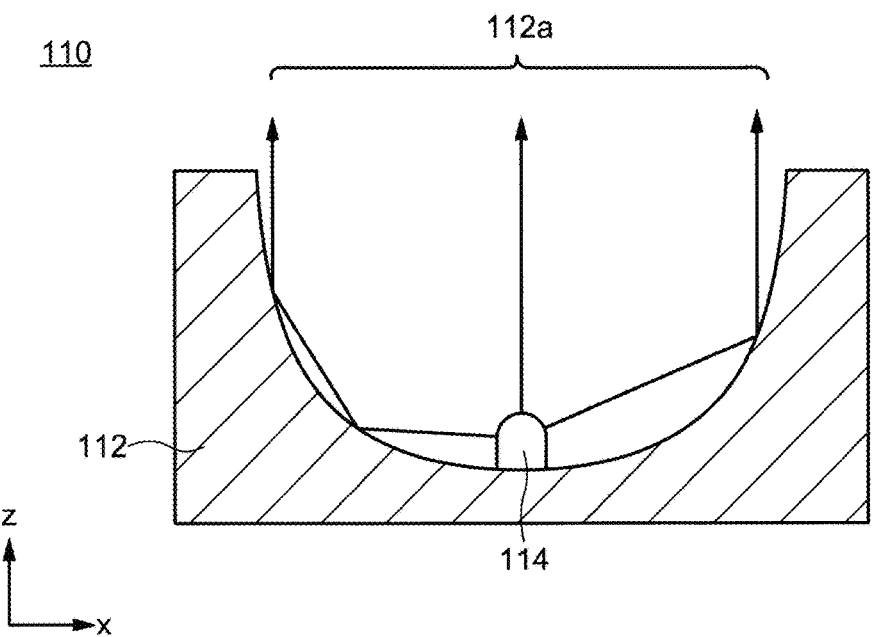
FIG. 1B is a schematic cross-sectional view of a light source of a lighting device according to an embodiment of the present invention.

The material structuring the reflector 112 may be arbitrarily selected and may be a metal such as aluminum and stainless steel, a polymer such as a polyimide, a polycarbonate, and an acrylic resin, or an inorganic oxide such as glass, for example. However, as indicated by the arrows in FIG. 1B, the reflector 112 reflects and concentrates the light from the light-emitting elements 114 to provide the collimated light to the liquid crystal panels 120. Therefore, when the reflector 112 is configured with a material transmitting visible light such as glass and a polymer, it is preferable to configure the surface of the depressed portion 112a with a film having a high reflectance to visible light. Examples of such films include a film containing a metal such as aluminum, silver, gold, chromium, and stainless steel, a laminate of thin films containing a highly refractive-index material such as titanium oxide and tantalum oxide and thin films containing a low refractive-index material such as silicon oxide and magnesium fluoride, and the like. The shape of the depressed portion 112a is appropriately adjusted to reflect the light from the light-emitting elements 114 in the depressed portion 112a to obtain highly directional light.

Figure 2A:
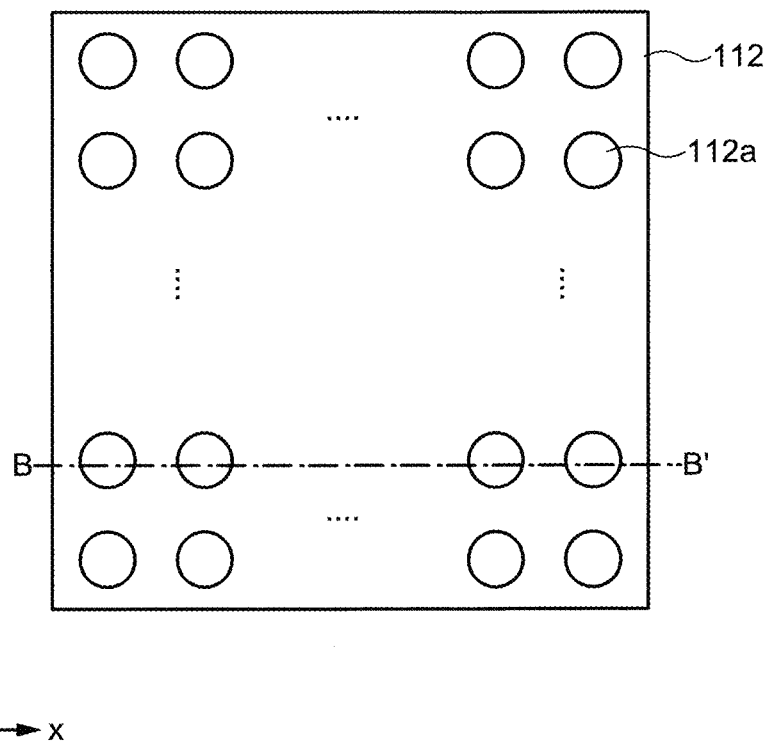
FIG. 2A is a schematic top view of a light source of a lighting device according to an embodiment of the present invention.
Figure 2B:
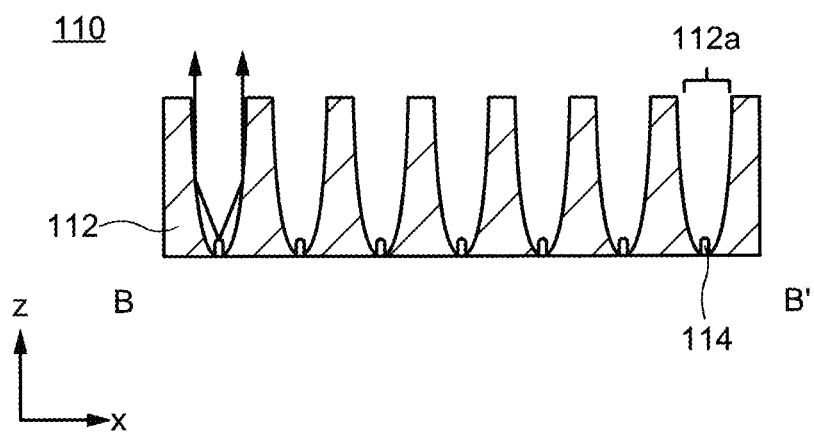
FIG. 2B is a schematic cross-sectional view of a light source of a lighting device according to an embodiment of the present invention.

The reflector 112 may be provided with a plurality of depressed portions 112a. For example, the reflector 112 may be provided with a plurality of depressed portions 112a as shown in the schematic top view of FIG. 2A and the schematic view of the cross section along the chain line B-B' in FIG. 2A (FIG. 2B). The planar shape of the depressed portions 112a in the upper surface of the reflector 112 (the upper surface closer to the liquid crystal panels 120) is also not restricted and may be a circle as shown in FIG. 2A or a polygon exemplified by a square. One or a plurality of light-emitting elements 114 is placed in the depressed portions 112a. When the plurality of depressed portions 112a is provided, the light from each depressed portion 112a illuminates a portion of the liquid crystal panels 120.

The light-emitting element 114 is an element having an ability to emit light when supplied with an electric current, and there are no restrictions on its structure. A typical example is a light-emitting diode (LED). A light-emitting diode has, as its fundamental structure, an electroluminescent element in which an inorganic emitter such as gallium nitride and gallium nitride containing indium is sandwiched between a pair of electrodes as well as a protective film protecting the electroluminescent element, for example, and is configured to emit visible light by the electroluminescence. The emission color of each light-emitting element 114 may also be arbitrarily selected. For example, one or a plurality of white-emissive light-emitting elements 114 may be provided in each depressed portion 112a. Alternatively, the light source 110 may be configured to obtain emission with various colors by providing a red-emissive light-emitting element 114, a green-emissive light-emitting element 114, and a blue-emissive light-emitting element 114 in the depressed portion 112a.

There is no restriction on the size of each light-emitting element 114. For example, a light-emitting diode with an occupied area equal to or greater than $1.0 \times 10^4$ μm$^2$ and equal to or less than $1.0 \times 10^6$ μm$^2$, equal to or greater than $4.0 \times 10^4$ μm$^2$ and equal to or less than $5.0 \times 10^5$ μm$^2$, or equal to or greater than $9.0 \times 10^4$ μm$^2$ and equal to or less than $2.5 \times 10^5$ μm$^2$ may be used. As an example, a so-called micro LED of about 320 μm×300 μm in size may be used as the light-emitting element 114.

2. Liquid Crystal Panel

Figure 3:
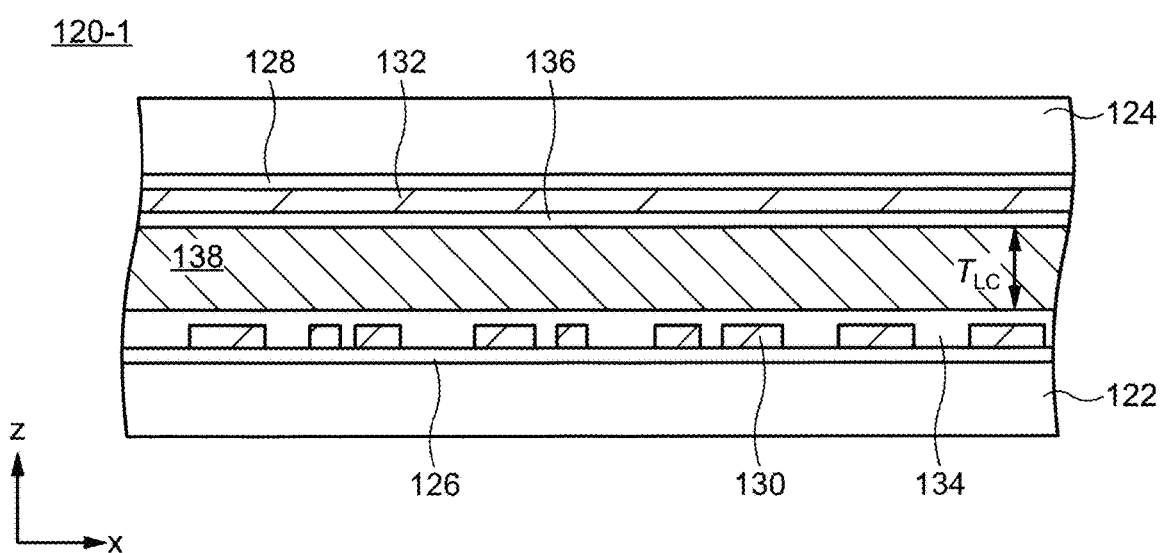
FIG. 3 is a schematic cross-sectional view of a liquid crystal panel of a lighting device according to an embodiment of the present invention.

The two liquid crystal panels 120 may have the same structure as each other. A portion of a schematic cross-sectional view of one liquid crystal panel 120 (in this case, the first liquid crystal panel 120-1) is shown in FIG. 3. As shown in FIG. 3, each liquid crystal panel 120 has, as its fundamental components, a substrate 122 and a counter substrate 124 facing each other as well as a plurality of lower electrodes 130, a first orientation film 134 over the plurality of lower electrodes 130, a liquid crystal layer 138 over the first orientation film 134, a second orientation film 136 over the liquid crystal layer 138, and a plurality of upper electrodes 132 over the second orientation film 136a which are sandwiched between the substrate 122 and the counter substrate 124. Each liquid crystal panel 120 may include, as an optional component, an undercoat 126 between the substrate 122 and the lower electrodes 130 and an overcoat 128 between the upper electrodes 132 and the counter substrate 124, which function as protective films to prevent impurities from entering the liquid crystal layer 138.

2-1. Substrate and Counter Substrate

The substrate 122 and the counter substrate 124 are bonded to each other with a sealing material provided in a frame shape, and each function as a base material for supporting the plurality of lower electrodes 130 and the plurality of upper electrodes 132 and for encapsulating the liquid crystal layer 138. The substrate 122 and the counter substrate 124 are preferred to include a material exhibiting high transmittance with respect to the light from the light-emitting elements so as to allow the light from the light-emitting elements 114 to transmit the light from the light source 110, thereby realizing the illumination function. Therefore, it is preferable to configure the substrate 122 and the counter substrate 124 to include, for example, glass, quartz, or a polymeric material such as a polyimide, a polycarbonate, a polyester, and an acrylic resin.

2-2. Lower Electrode and Upper Electrode (1) Outline

The plurality of lower electrodes 130 is provided over the substrate 122 so as to be in contact with the substrate 122 or through the undercoat 126 (FIG. 3). The undercoat 126 may be formed with one or a plurality of films containing a silicon-containing inorganic compound such as silicon nitride and silicon oxide. The lower electrode 130 is preferably formed of a conductive oxide exhibiting high transmittance to visible light such as indium-tin oxide (ITO) and indium-zinc oxide (IZO) in order to provide a high light-transmitting property to the liquid crystal panels 120.

Figure 4A:
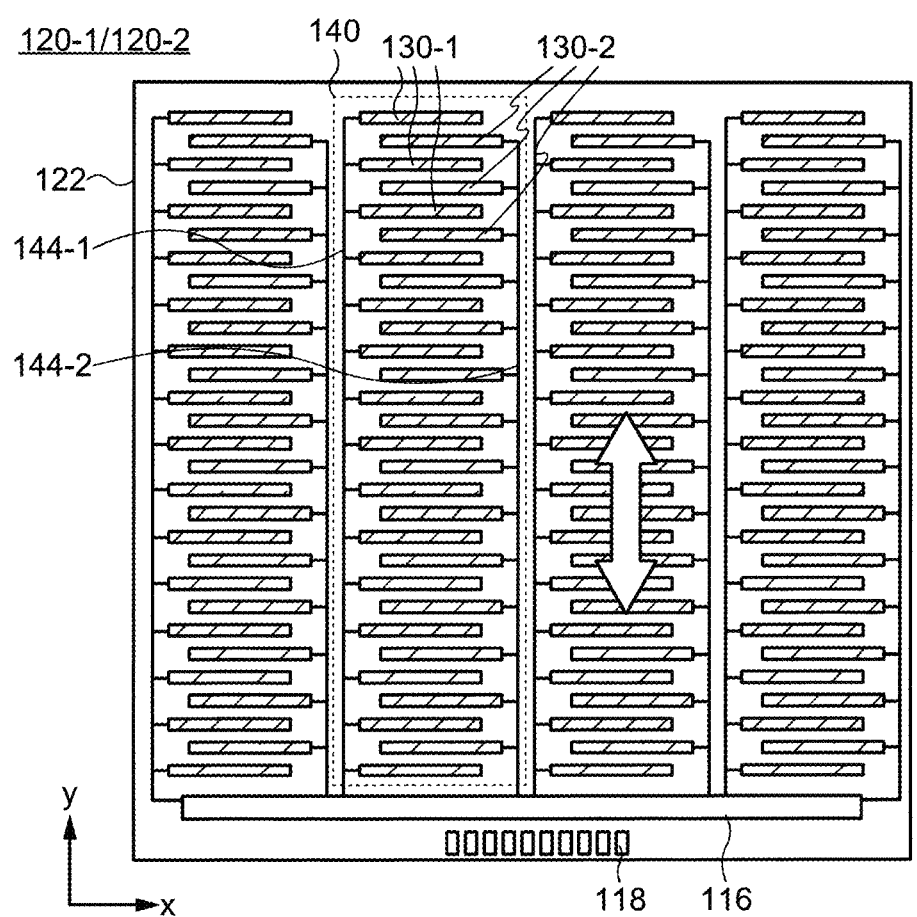
FIG. 4A is a schematic top view of a liquid crystal panel of a lighting device according to an embodiment of the present invention.

A schematic top view of the plurality of lower electrodes 130 disposed over the substrate 122 is shown in FIG. 4A. As can be understood from FIG. 3 and FIG. 4A, the plurality of lower electrodes 130 extends in the same direction as one another and is arranged in a stripe shape. The length of each lower electrode 130 (the length in the direction in which the lower electrodes 130 extend (in this case, in the x direction)) may be selected from a range equal to or greater than 5 cm and equal to or less than 15 cm or equal to or greater than 1 cm and equal to or less than 10 cm, for example.

Here, the plurality of lower electrodes 130 may be divided into one or a plurality of lower electrode groups 140. The plurality of lower electrode groups 140 is arranged in the direction in which the lower electrodes 130 extend (here, the x direction). Focusing on one lower electrode group 140, the plurality of lower electrodes 130 is arranged in one row in the y direction orthogonal to the x direction in which the lower electrodes 130 extend. The length of each lower electrode group in the y direction may also be arbitrarily set and may be selected from a range equal to or greater than 3 cm and equal to or less than 30 cm or equal to or greater than 10 cm and equal to or less than 20 cm, for example. In each lower electrode group 140, a plurality of lower electrodes 130-1 selected every other one in the y direction is connected to the wiring 144-1 and is electrically connected to one another. Therefore, the same potential is simultaneously applied to these lower electrodes 130-1. On the other hand, the remaining lower electrodes 130-2 are connected to the wiring 144-2 and are electrically connected to one another. Therefore, the same potential is also applied to these lower electrodes 130-2 simultaneously, and the lower electrodes 130-1 and the lower electrodes 130-2 are electrically independent from each other. In the y direction, the lower electrodes 130-1 and the lower electrodes 130-2 alternate.

Figure 4B:
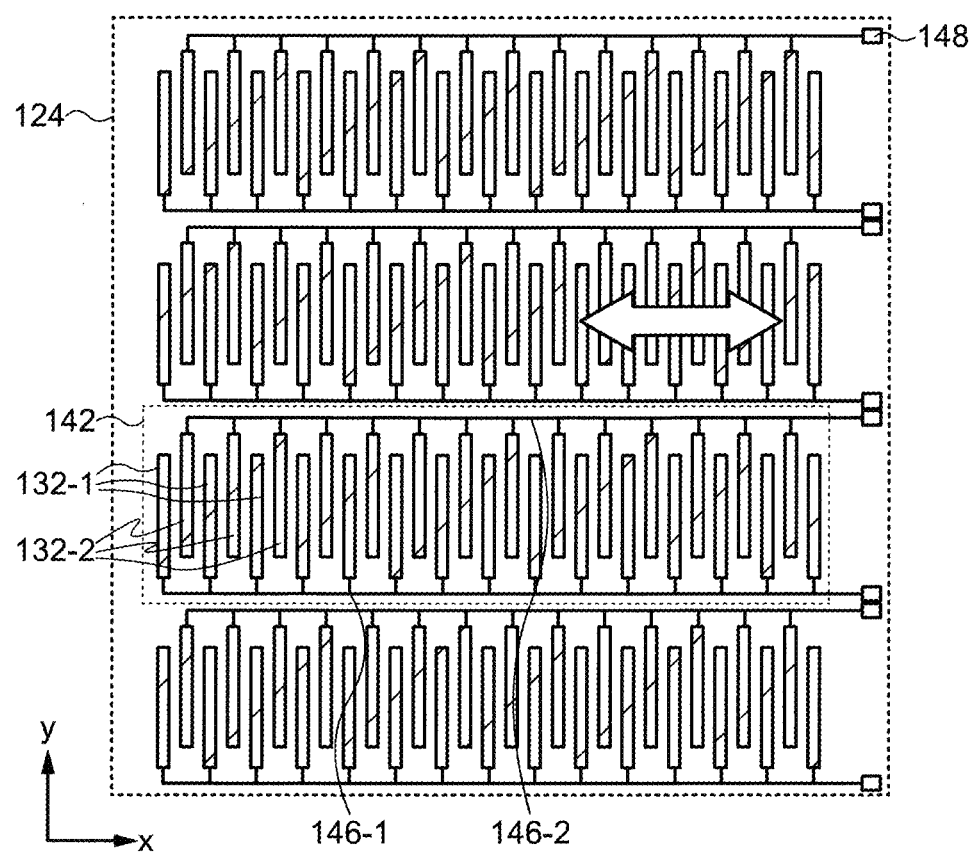
FIG. 4B is a schematic top view of a liquid crystal panel of a lighting device according to an embodiment of the present invention.

The plurality of upper electrodes 132 is provided over the counter substrate 124 (below the counter substrate 124 in FIG. 3) so as to be in contact with the counter substrate 124 or through the overcoat 128 as shown in FIG. 3. A schematic top view of the plurality of upper electrodes 132 arranged on the counter substrate 124 side is shown in FIG. 4B. FIG. 4B is a schematic view of the upper electrodes 132 viewed from the counter substrate 124 side (planar view from above). Similar to the lower electrodes 130, the plurality of upper electrodes 132 is also formed of a conductive oxide exhibiting high transmittance with respect to visible light and is arranged in a stripe shape. However, the extending direction thereof is different. Specifically, the plurality of upper electrodes 132 each extends in the y direction orthogonal to the x direction in which the lower electrodes 130 extend as shown in FIG. 4B. Similar to the lower electrodes 130, the plurality of upper electrodes 132 may also be divided into one or a plurality of upper electrode groups 142. The plurality of upper electrode groups 142 is arranged in the y direction in which the upper electrodes 132 extend. Focusing on one upper electrode group 142, the plurality of upper electrodes 132 is arranged in one row in the x direction orthogonal to the y direction in which the upper electrodes 132 extend. In each upper electrode group 142, the plurality of upper electrodes 132-1 selected every other one in the x direction is connected to the wiring 146-1 and is electrically connected to one another. Therefore, the same potential is applied to these upper electrodes 132-1 simultaneously. On the other hand, the remaining upper electrodes 132-2 are connected to the wiring 146-2 and are electrically connected to one another. Therefore, the same potential is also applied to these 132-2 upper electrodes simultaneously, and the upper electrodes 132-1 and the upper electrodes 132-2 are electrically independent. In the x direction, the upper electrodes 132-1 and the upper electrodes 132-2 alternate.

(2) Arrangement of Lower Electrode

Figure 5:
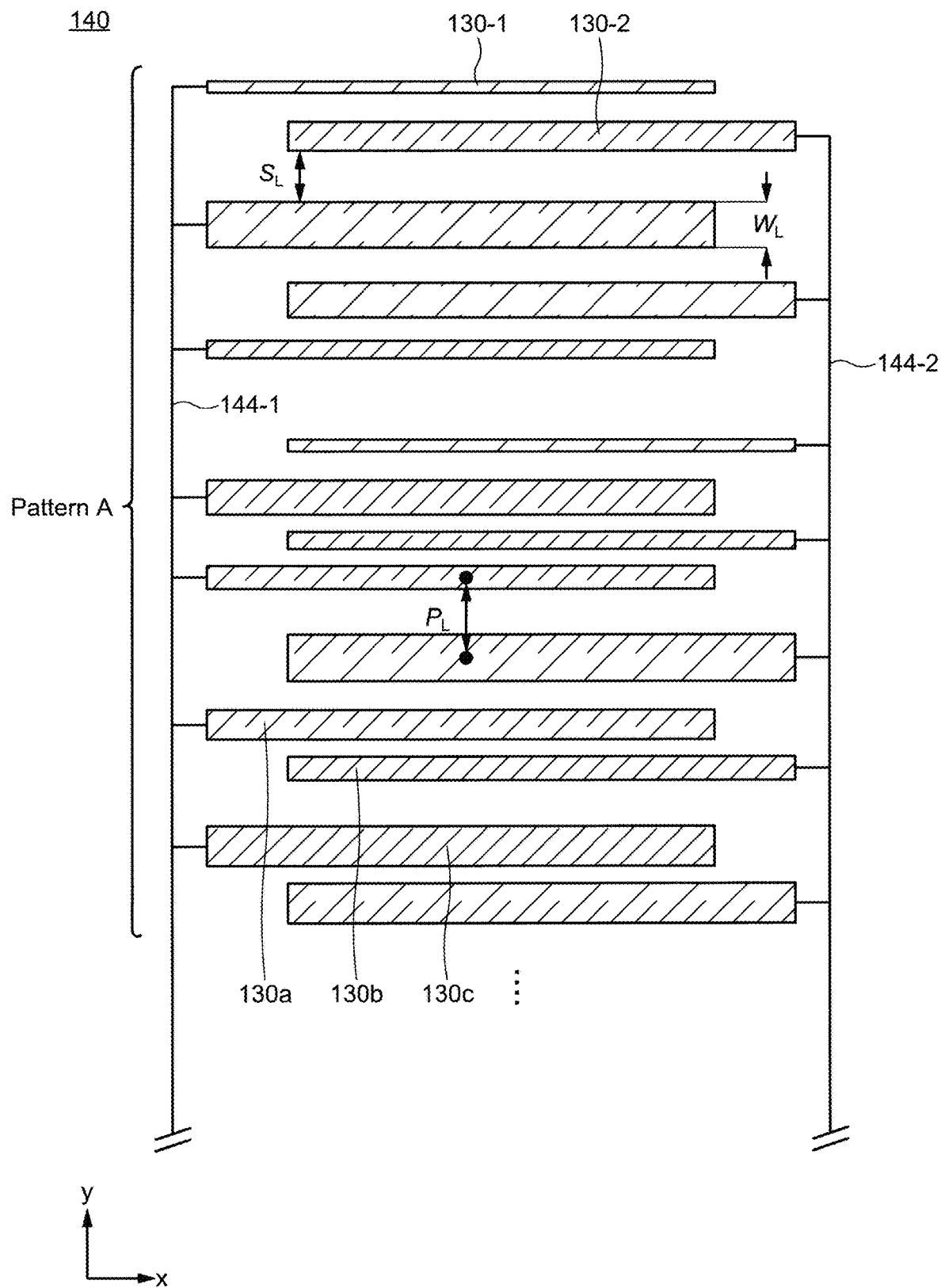
FIG. 5 is a schematic top view of a liquid crystal panel of a lighting device according to an embodiment of the present invention.

Details of the arrangement of the lower electrodes 130 are explained using FIG. 5. FIG. 5 is a schematic top view of a portion of one lower electrode group 140. As shown in FIG. 5, each lower electrode group 140 is configured so that at least one of the spacings $S_L$ between adjacent lower electrodes 130, the widths (length in a direction perpendicular to the extending direction) $W_L$ of the lower electrodes 130, and the pitches $P_L$ of the lower electrodes 130 varies.

The variation of the spacings of adjacent lower electrodes 130 means that the spacings $S_L$ between two lower electrodes 130 adjacent in the y direction are not constant within one lower electrode group 140. For example, with respect to three lower electrodes 130a, 130b, and 130c arbitrarily selected within one lower electrode group 140 and continuously arranged in the y direction, the spacing $S_L$ between the lower electrodes 130a and 130b is different from the spacing $S_L$ between the lower electrodes 130b and 130c. In one lower electrode group 140, the coefficient of variation $CV_{LS}$ of the spacings $S_L$ between two adjacent lower electrodes 130 may be equal to or greater than 0.18 and equal to or less than 0.35 or equal to or greater than 0.18 and equal to or less than 0.30. The coefficient of variation $CV_{LS}$ is obtained by dividing the standard deviation of the spacings $S_L$ of the lower electrodes 130 by their mean value. The spacing $S_L$ between two adjacent lower electrodes 130 may be selected from a range equal to or greater than 1 μm and equal to or less than 30 μm or equal to or greater than 3 μm and equal to or greater less 20 μm, for example.

Variation of the widths of the lower electrodes 130 means that the widths $W_L$ of the lower electrodes 130 are not constant within one lower electrode group 140. For example, the widths of the above three lower electrodes 130a, 130b, 130c are all different, or at least one is different from the other two. Within one lower electrode group 140, the coefficient of variation $CV_{LW}$ of the widths $W_L$ of the lower electrodes 130 may be equal to or greater than 0.13 and equal to or less than 0.35 or equal to or greater than 0.15 and equal to or less than 0.30. The coefficient of variation $CV_{LW}$ is obtained by dividing the standard deviation of the widths $W_L$ of the lower electrodes 130 by their mean value. The width $W_L$ of the lower electrode 130 may be selected from a range equal to or greater than 3 μm and equal to or less than 20 μm or equal to or greater than 5 μm and equal to or less than 15 μm.

The pitch $P_L$ of the lower electrodes 130 is a length of a straight line parallel to the y direction and connecting the center points in the y direction of the adjacent lower electrodes 130. The variation of the pitches of the lower electrodes 130 means that the pitches $P_L$ between two arbitrarily selected adjacent lower electrodes 130 within one lower electrode group 140 are not constant. For example, focusing on the above three lower electrodes 130a, 130b, 130c, the pitch $P_L$ between the lower electrodes 130a and 130b is different from the pitch $P_L$ between the lower electrodes 130b and 130c. In one lower electrode group 140, the coefficient of variation $CV_{LP}$ of the pitches $P_L$ between adjacent lower electrodes 130 may be equal to or greater than 0.08 and equal to or less than 0.25 or equal to or greater than 0.09 and equal to or less than 0.20. The coefficient of variation $CV_{LP}$ is obtained by dividing the standard deviation of the pitches $P_L$ between adjacent lower electrodes 130 by their mean value. The pitch $P_L$ may be selected from a range equal to or greater than 2 μm and equal to or less than 30 μm or equal to or greater than 3 μm and equal to or less than 25 μm.

In each lower electrode group 140, the spacings $S_L$ and the widths $W_L$ may be constant, while the pitches $P_L$ may vary. Alternatively, the spacings $S_L$ may vary while the widths $W_L$ and the pitches $P_L$ may be constant, or the widths $W_L$ may vary while the spacings $S_L$ and the pitches $P_L$ may be constant. Alternatively, the widths $W_L$ may be constant, while the spacings $S_L$ and the pitches $P_L$ may vary. Alternatively, the spacings $S_L$ may be constant while the widths $W_L$ and the pitches $P_L$ may vary. Alternatively, the pitches $P_L$ may be constant, while the widths $W_L$ and the spacings $S_L$ may vary. Alternatively, the spacings $S_L$, the widths $W_L$, and the pitches $P_L$ may all vary.

Note that, in one lower electrode group 140, all of the lower electrodes 130 may not have periodic regularity with respect to the widths $W_L$, the spacings $S_L$, and the pitches $P_L$, or a pattern (pattern A in FIG. 5) of the widths $W_L$, the spacings $S_L$, and the pitches $P_L$ of the plurality of (e.g., 10, 20, 24) lower electrodes 130 continuously arranged in the y direction may be periodically repeated.

(3) Arrangement of Upper Electrode

Figure 6:
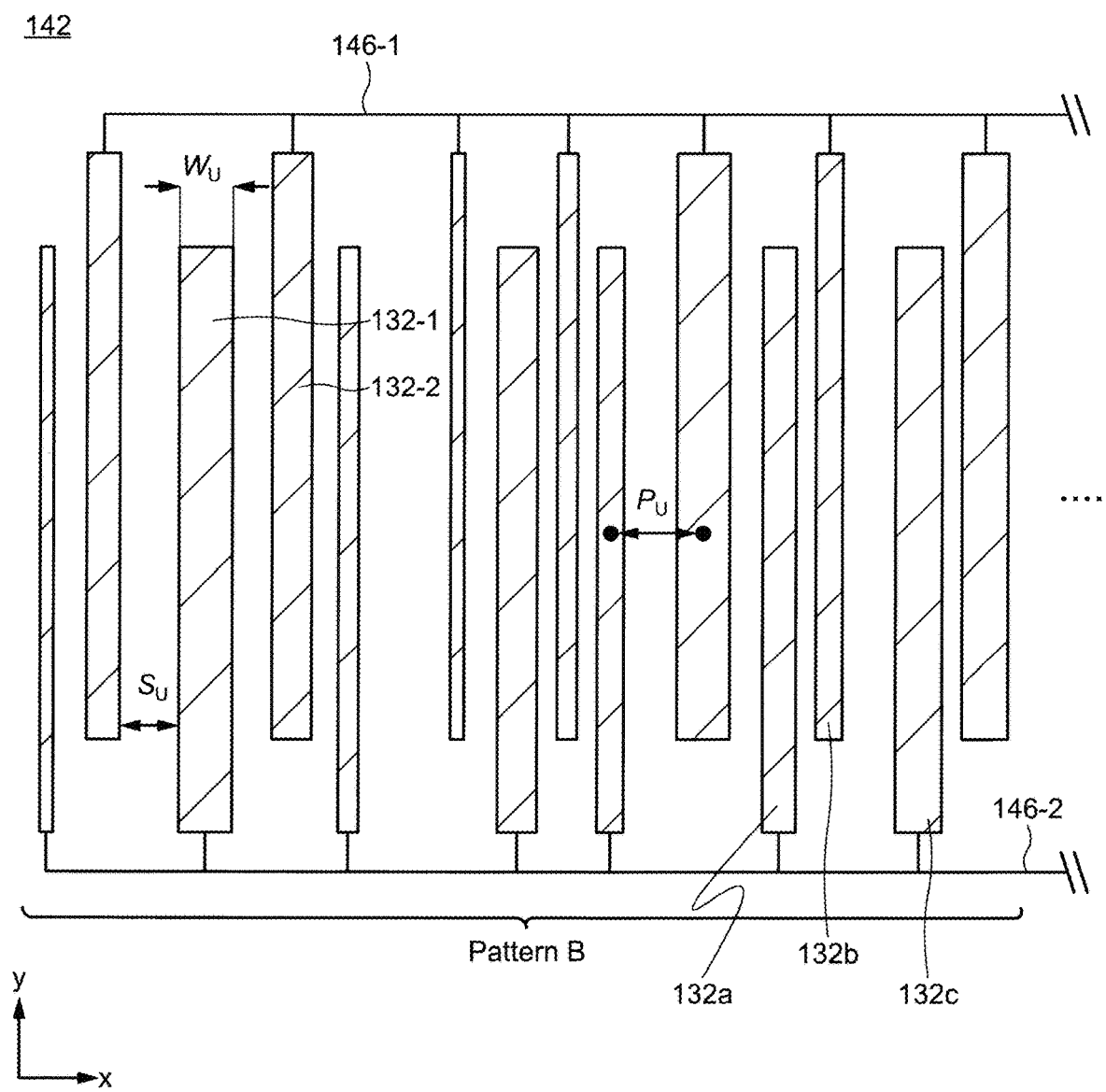
FIG. 6 is a schematic top view of a liquid crystal panel of a lighting device according to an embodiment of the present invention.

The arrangement of the upper electrodes 132 is similar. FIG. 6 shows a schematic top view of a portion of one upper electrode group 142. As shown in FIG. 6, each of the upper electrode groups 142 is configured so that at least one of the spacings $S_U$ between adjacent upper electrodes 132, the widths (length in a direction perpendicular to the extending direction) $W_U$ of the upper electrodes 132, and the pitches $P_U$ of the upper electrodes 132 may vary.

The variation of the spacings of adjacent upper electrodes 132 means that the spacings $S_U$ between two upper electrodes 132 adjacent in the x direction are not constant within one upper electrode group 142. For example, with respect to three upper electrodes 132a, 132b, and 132c arbitrarily selected and continuously arranged in the x direction within one upper electrode group 142, the spacing $S_U$ between the upper electrodes 132a and 132b is different from the spacing $S_U$ between the upper electrodes 132b and 132c. In one upper electrode group 142, the coefficient of variation $CV_{US}$ of the spacings $S_U$ between two adjacent upper electrodes 132 may be equal to or greater than 0.18 and equal to or less than 0.35 or equal to or greater than 0.20 and equal to or less than 0.30. The coefficient of variation $CV_{US}$ is obtained by dividing the standard deviation of the spacings $S_U$ of the upper electrodes 132 by their mean value. The spacing $S_U$ of two adjacent upper electrodes may be selected from a range equal to or greater than 1 μm and equal to or less than 30 μm or equal to or greater than 3 μm and equal to or less than 20 μm, for example.

The variation of the widths of the upper electrodes 132 means that the widths $W_U$ of the upper electrodes 132 are not constant in one upper electrode group 142. For example, the widths of the above three upper electrodes 132a, 132b, 132c are all different, or at least one is different from the other two. In one upper electrode group 142, the coefficient of variation $CV_{UW}$ of the widths $W_U$ of the upper electrodes 132 may be equal to or greater than 0.13 and equal to or less than 0.35 or equal to or greater than 0.15 and equal to or less than 0.30. The coefficient of variation $CV_{UW}$ is obtained by dividing the standard deviation of the widths $W_U$ of the upper electrodes 132 by their mean value. The width $W_U$ of the upper electrode 132 may be selected from a range equal to or greater than 3 μm and equal to or less than 20 μm or equal to or greater than 5 μm and equal to or less than 15 μm.

The pitch $P_U$ of the upper electrodes 132 is the length of a straight line parallel to the x direction and connecting the center points in the x direction of the adjacent upper electrodes 132. The variation of the pitches of the upper electrodes 132 means that the pitches $P_U$ between two arbitrarily selected upper electrodes 132 within one upper electrode group 142 are not constant. For example, focusing on the above three upper electrodes 132a, 132b, and 132c, the pitch $P_U$ between the upper electrodes 132a and 132b is different from the pitch $P_U$ between the upper electrodes 132b and 132c. In one upper electrode group 142, the coefficient of variation $CV_{UP}$ of the pitches $P_U$ between adjacent upper electrodes 132 may be equal to or greater than 0.08 and equal to or less than 0.25 or equal to or greater than 0.09 and equal to or less than 0.20. The coefficient of variation $CV_{UP}$ is obtained by dividing the standard deviation of the pitches $P_U$ between adjacent upper electrodes 132 by their mean value. The pitch $P_U$ may be selected from a range equal to or greater than 2 μm and equal to or less than 30 μm or equal to or greater than 3 μm and equal to or less than 25 μm.

Similar to the lower electrode group 140, the spacings $S_U$ and the widths $W_U$ may be constant, while the pitches $P_U$ may vary in each upper electrode group 142. Alternatively, the spacings $S_U$ may vary while the widths $W_U$ and the pitches $P_U$ may be constant, or the widths $W_U$ may vary while the spacings $S_U$ and the pitches $P_U$ may be constant. Alternatively, the widths $W_U$ may be constant, while the spacings $S_U$ and the pitches $P_U$ may vary. Alternatively, the spacings $S_U$ may be constant, while the widths $W_U$ and the pitches $P_U$ may vary. Alternatively, the pitches $P_U$ may be constant, while the widths $W_U$ and the spacings $S_U$ may vary. Alternatively, the spacings $S_U$, the widths $W_U$, and the pitches $P_U$ may all vary.

Note that, in one group of upper electrodes 142, all of the upper electrodes 132 may not have periodic regularity with respect to the widths $W_U$, the spacings $S_U$, and the pitches $P_U$, or a pattern (pattern B in FIG. 6) of the widths $W_U$, the spacings $S_U$, and the pitches $P_U$ of the plurality of (e.g., 10, 20, 24) upper electrodes 132 continuously arranged in the x direction may be periodically repeated.

2-3. First Orientation Film, Second Orientation Film, and Liquid Crystal Layer

The first orientation film 134 is provided over the plurality of lower electrodes 130, and the second orientation film 136 is provided over the plurality of top electrodes 132 (under the top electrodes 132 in FIG. 3). The substrate 122 and the counter substrate 124 are bonded and secured together by a sealing material which is not illustrated. The space formed by the substrate 122, the counter substrate 124, and the sealing material is filled with the liquid crystal layer 138.

The first orientation film 134 and the second orientation film 136 contain a polymer such as a polyimide and a polyester, and their surfaces are subjected to a rubbing process. The rubbing treatment is performed so that the orientation direction of the first orientation film 134 is orthogonal to the direction in which the lower electrodes 130 extend (see the arrow in FIG. 4A), while the orientation direction of the second orientation film 136 is orthogonal to the direction in which the upper electrodes 132 extend (see the arrow in FIG. 4B). Thus, the orientation direction of the first orientation film 134 and the orientation direction of the second orientation film 136 are orthogonal. Here, the orientation direction is the direction of the long axis of the liquid crystal molecules when oriented under the influence of the orientation film. Instead of the rubbing process, the orientation directions of the first orientation film 134 and the second orientation film 136 may be created by photo-alignment. The photo-alignment is a rubbing-less alignment process using light. For example, an orientation film which has not been subjected to the rubbing process is irradiated with polarized light in the ultraviolet region from a predetermined direction. This process causes a photoreaction in the orientation film, thereby introducing anisotropy to the surface of the orientation film to provide the ability to control the liquid crystal orientation.

The liquid crystal layer 138 contains liquid crystal molecules. The structure of the liquid crystal molecules is not limited. Thus, the liquid crystal molecules may be nematic liquid crystals, smectic liquid crystals, cholesteric liquid crystals, or chiral smectic liquid crystals.

The thickness $T_{LC}$ of the liquid crystal layer 138 (see FIG. 3), i.e., the distance between the first orientation film 134 and the second orientation film 136, is also arbitrary, but is preferable to be greater than the pitches $P_L$ and $P_U$ of the lower electrodes 130 and the upper electrodes 132. For example, the thickness $T_{LC}$ of the liquid crystal layer 138 is preferably set to be equal to or greater than 2 times and equal to or less than 10 times, equal to or greater than 2 times and equal to or less than 5 times, or equal to or greater than 2 times and equal to or less than 3 times the pitches $P_L$ and $P_U$ of the lower electrodes 130 and the upper electrodes 132. The specific thickness of the liquid crystal layer 138 may be selected from a range equal to or greater than 10 μm and equal to or less than 60 μm or equal to or greater than 10 μm and equal to or less than 50 μm, for example. Although not illustrated, spacers may be provided in the liquid crystal layer 138 to maintain this thickness throughout the entire lighting device 100. When the thickness of the liquid crystal layer 138 described above is employed in a liquid crystal display device, the high responsiveness required for displaying moving images cannot be obtained, and it becomes significantly difficult to realize the functions as a liquid crystal display device.

2-4. Other Components

As shown in FIG. 4A, the lower electrodes 130 are connected to the driver circuit 116 arranged over the substrate 122 through wirings 144. The driver circuit 116 is further connected to a plurality of terminals 118, and signals to drive the lighting device 100 are supplied to the driver circuit 116 via the terminals 118 from an external circuit which is not illustrated. The driver circuit 116 supplies voltages to the lower electrodes 130 on the basis of these signals. The wirings 146 are connected to wirings, which are not illustrated, over the substrate 122 via contacts 148 (see FIG. 4B). This wiring is also connected to the driver circuit 116, and the driver circuit 116 also supplies voltages to the upper electrodes 132 on the basis of the signals supplied from the external circuit via the terminals 118.

The driver circuit 116 may be fabricated by combining a variety of patterned conductive films, semiconductor films, and conductive films over the substrate 122 as appropriate or by mounting, over the substrate 122, an IC chip with integrated circuits formed over a semiconductor substrate. Alternatively, the driver circuit 116 may not be provided over the substrate 122, but an IC chip may be provided as the driver circuit 116 over a flexible printed circuit board (FPC) connected to the terminals 118.

3. Operation Principle

Figure 7:
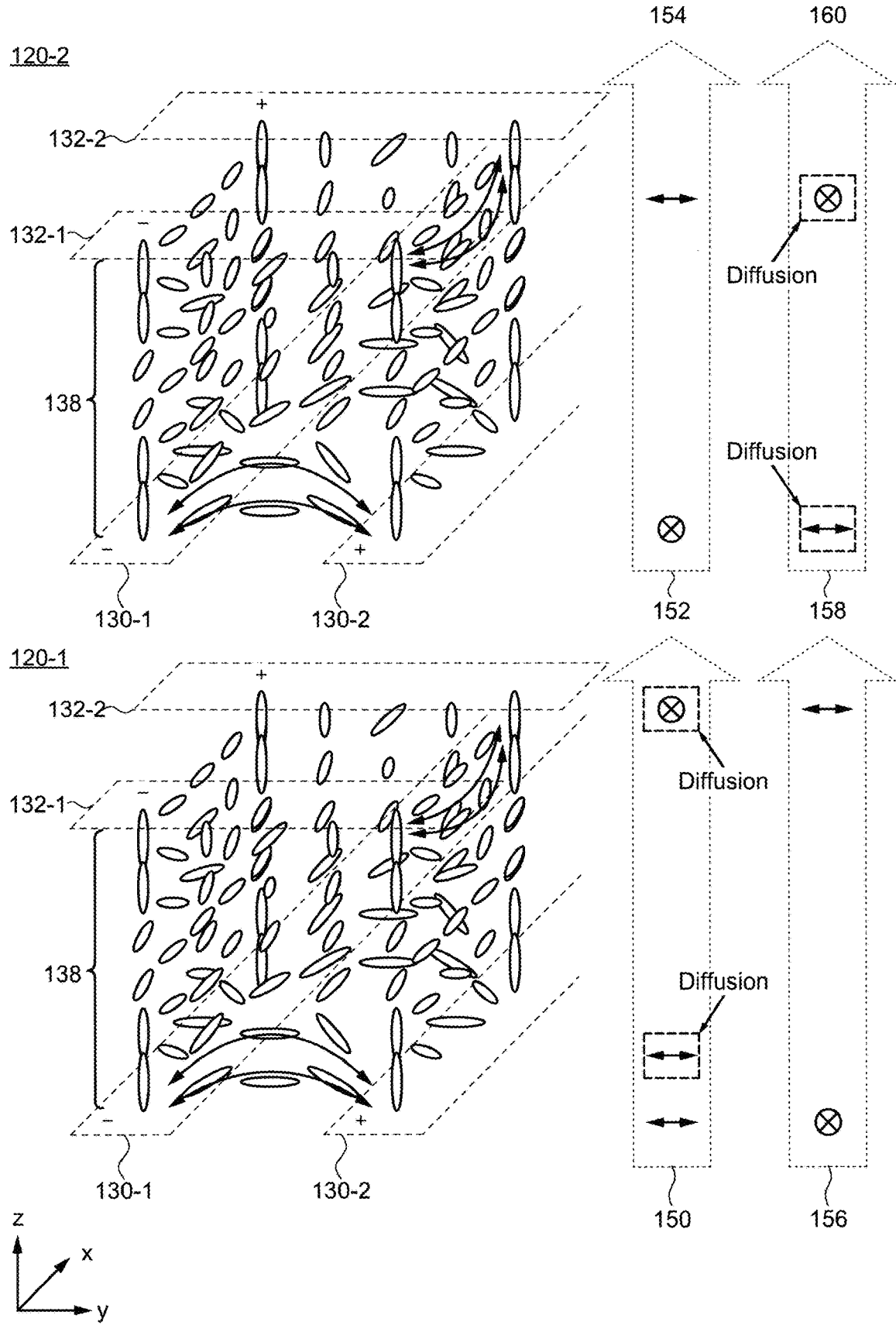
FIG. 7 is a schematic perspective view for explaining an operation principle of a lighting device according to an embodiment of the present invention.

The operation principle of the lighting device 100 is explained using the schematic view in FIG. 7. Here, the lower electrodes 130 and the upper electrodes 132 are shown in dotted lines to illustrate the behavior of the liquid crystal molecules indicated by ellipses, and other components are omitted.

When the liquid crystal panels 120 are driven, a pulsed AC voltage is applied to the plurality of lower electrodes 130 so that the phase is inverted between adjacent lower electrodes 130. Similarly, a pulsed AC voltage is applied to the plurality of upper electrodes 132 so that the phase is inverted between adjacent upper electrodes 132. Within each liquid crystal panel 120, the frequencies of these AC voltages are the same. The AC voltages may be selected from a range equal to or greater than 3 V and equal to or less than 50 V or equal to or greater than 3 V and equal to or less than 30 V, for example. Since the directions in which the lower electrodes 130 and the upper electrodes 132 extend are orthogonal, the application of the AC voltages generates electric fields (transverse electric fields) orthogonal to each other between adjacent lower electrodes 130 and between adjacent upper electrodes 132 (see curved arrows in FIG. 7). Note that although an electric field (vertical electric field) is also generated between the lower electrodes 130 and the upper electrodes 132, the thickness $T_{CL}$ of the liquid crystal layer 138 is larger than the spacing $S_L$ between adjacent lower electrodes 130 and the spacing $S_U$ between adjacent upper electrodes 132. Therefore, the vertical electric field is significantly smaller than the transverse electric field and can be ignored so that each liquid crystal molecule is oriented according to the transverse electric field.

When the transverse electric field is generated in the liquid crystal layer 138, the liquid crystal molecules on the substrate 122 side are oriented in an upwardly convex arc shape. The same is applied to the counter substrate 124 side, where the liquid crystal molecules are oriented in a downwardly convex arc shape (FIG. 7). This change in orientation of the liquid crystal molecules causes a refractive index distribution, and as a result, the component of the light (polarization component) 150, which is incident on the liquid crystal layer 138 from the lower electrode 130 side of the first liquid crystal panel 120-1 and which is parallel to the transverse electric field formed by the lower electrodes 130, is diffused. In addition, the orientation direction of the liquid crystal molecules rotates and twists by 90° about the z direction as a central axis as it approaches the counter substrate 124 from the substrate 122. As a result, the diffused component 150 optically rotates by 90° while passing through the liquid crystal layer 138. Furthermore, the diffused and optically rotated component 150 diffuses according to the refractive index distribution of the arc-shaped oriented liquid crystal molecules on the counter substrate 124 side, resulting in the component (polarization component) 152. On the other hand, the component (polarization component) 156 orthogonal to the component 150 does not diffuse because its polarization axis is perpendicular to the transverse electric field formed by the lower electrodes 130 of the first liquid crystal panel 120-1 and optically rotates by 90° in the liquid crystal layer 138. Since the polarization axis of the optically rotated component 156 is also perpendicular to the direction of the transverse electric field on the counter substrate 124 side, the component 156 does not diffuse and simply provides a component 158 (polarization component) with a polarization axis rotated by 90°. In this way, the first liquid crystal panel 120-1 functions as a lens diffusing one of the components of the incident light (component 150 in this case).

The same principle also works in the second liquid crystal panel 120-2. Without going into detail, the second liquid crystal panel 120-2 optically rotates and diffuses the component 158, while the second liquid crystal panel 120-2 does not diffuse but optically rotates the component 152. That is, the second liquid crystal panel 120-2 functions as a lens diffusing the component 156 which is not diffused by the first liquid crystal panel 120-1. In summary, all of the components of the incident light can be diffused using the first liquid crystal panel 120-1 and the second liquid crystal panel 120-2.

Figure 8A:
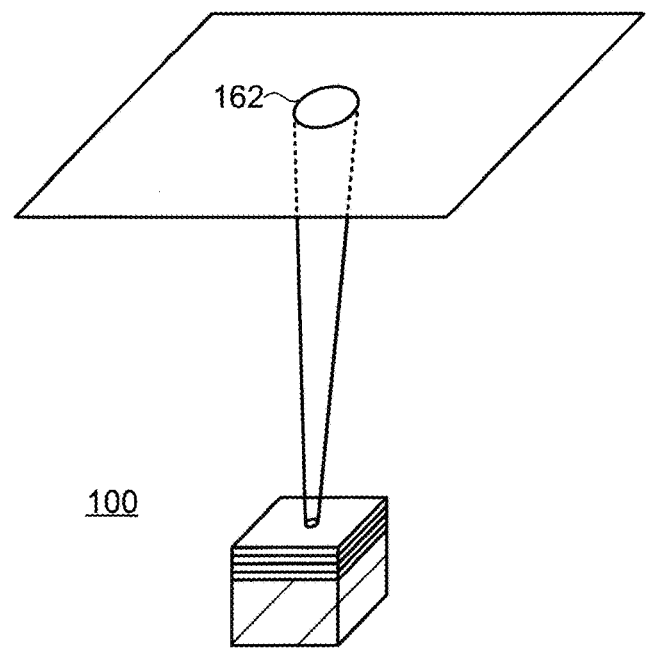
FIG. 8A is a schematic view showing an operation behavior of a lighting device according to an embodiment of the present invention.
Figure 8B:
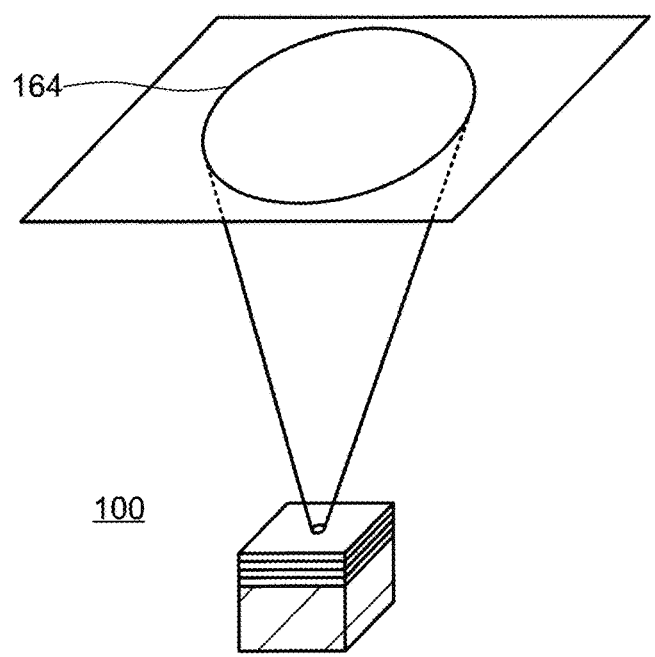
FIG. 8B is a schematic view showing an operation behavior of a lighting device according to an embodiment of the present invention.

When the liquid crystal panel 120 is not driven, no transverse electric field is generated. Therefore, when the liquid crystal panel 120 is not driven, the liquid crystal molecules are oriented according to the orientation directions of the first orientation film 134 and the second orientation film 136. Hence, the orientation direction of the liquid crystal molecules is in the orientation direction of the first orientation film 134 (i.e., the direction orthogonal to the extending direction of the lower electrodes 130) at the vicinity of the substrate 122 and rotates about the z direction as a central axis as it approaches the counter substrate 124 to eventually rotate 90°. As a result, it is possible to selectively illuminate a relatively narrow area because the highly directional collimated light emitted from the light source 110 only optically rotates without diffusing when the liquid crystal panel 120 is not driven (FIG. 8A). On the other hand, when the liquid crystal panel 120 is driven, the light from the light source 110 is diffused, resulting in an irradiated surface 164 with a wider area than the irradiated surface 162 provided by the lighting device 100 when the liquid crystal panel 120 is not driven (FIG. 8B). In addition, since the degree of diffusion depends on the strength of the transverse electric field, it is possible to control the diffusion of the light from the light source 110 by adjusting the potentials applied to the lower electrodes 130 and the upper electrodes 132. Thus, the lighting device 100 functions as a lighting device capable of arbitrarily controlling the irradiation area.

However, when the plurality of lower electrodes 130 and upper electrodes 132 is arranged so as to have high regularity, periodicity occurs in the refractive index distribution of the liquid crystal. For example, when the lower electrodes 130 and upper electrodes 132 are arranged so that the widths $W_L$ and $W_U$, the spacings $S_L$ and $S_U$, and the pitches $P_L$ and $P_U$ are constant within each lower electrode group 140 or each upper electrode group 142, periodicity is generated in the refractive index distribution of the liquid crystals when the liquid crystal panel 120 is driven. As a result, interference fringes (moiré) are generated on the irradiated surface 164. Even if the light-emitting element 114 providing white color is used, the light is colored due to the periodic refractive index distribution. Although moiré can be suppressed by placing a diffusion sheet over or below the liquid crystal panel 120, the light is diffused even when the liquid crystal panel 120 is not driven, resulting in the unintentionally spread irradiated surface 162.

On the other hand, the lighting device 100 is configured so that at least one of the spacings $S_L$, the widths $W_L$, and the pitches $P_L$ varies in each lower electrode group 140 as described above. Similarly, the lighting device 100 is configured so that at least one of the spacings $S_U$, the widths $W_U$, and the pitches $P_U$ varies in each upper electrode group 142. Hence, as demonstrated in the Examples described below, the periodicity of the refractive index distribution of the liquid crystal is considerably reduced, and as a result, the generation of moiré and light coloration can be effectively suppressed without using a diffusion sheet. In addition, since a diffusion sheet is not required, the light diffusion during the non-driving state of the liquid crystal panel 120 can also be avoided.

As described above, implementation of an embodiment of the present invention prevents the moiré generation and the light coloration, allowing the production of a lighting device capable of arbitrarily controlling the irradiation area.

Second Embodiment

In this embodiment, a modified example of the lighting device 100 described in the First Embodiment is explained. An explanation of the structures the same as or similar to those described in the First Embodiment may be omitted.

Figure 9A:
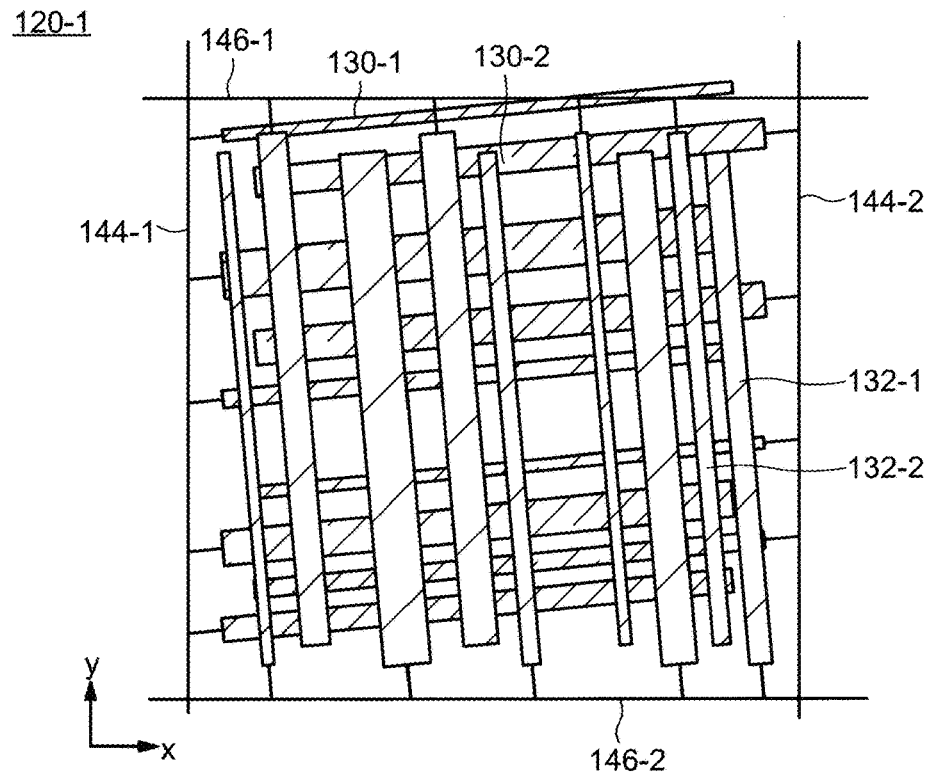
FIG. 9A is a schematic top view of a liquid crystal panel of a lighting device according to an embodiment of the present invention.
Figure 9B:
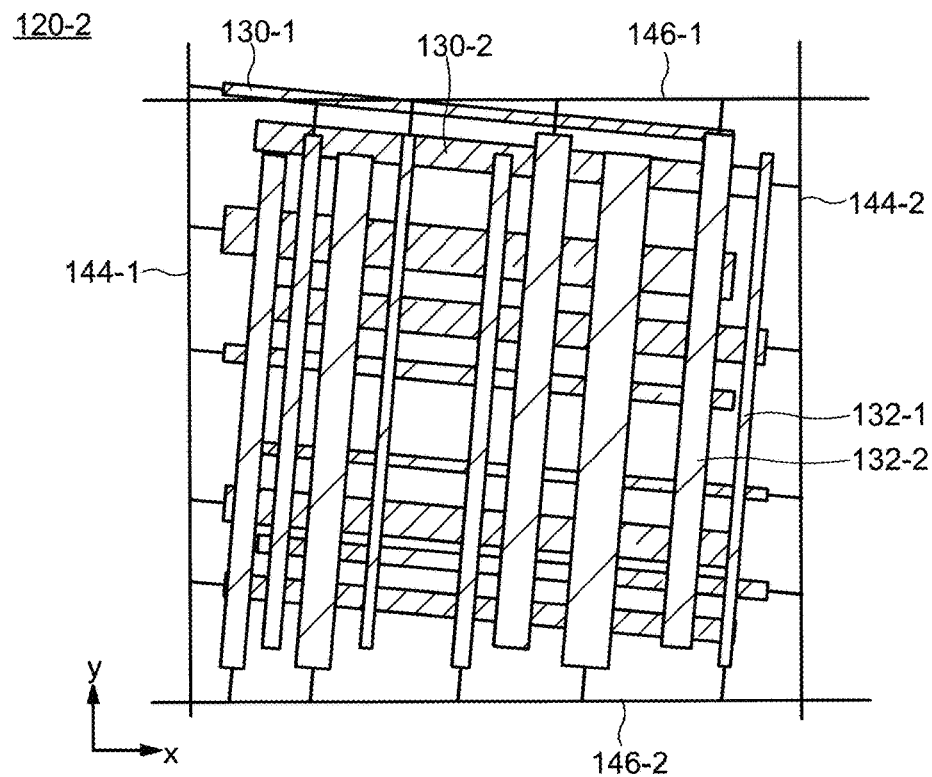
FIG. 9B is a schematic top view of a liquid crystal panel of a lighting device according to an embodiment of the present invention.

In this modified example, the lower electrodes 130 and the upper electrodes 132 are each arranged to be inclined as shown in the schematic top view of FIG. 9A and FIG. 9B. More specifically, the direction in which the lower electrodes 130 extend differs between the first liquid crystal panel 120-1 and the second liquid crystal panel 120-2. Similarly, the direction in which the upper electrodes 132 extend differs between the first liquid crystal panel 120-1 and the second liquid crystal panel 120-2. The angle (first angle) between the direction in which the lower electrodes 130 of the first liquid crystal panel 120-1 extend and the direction in which the lower electrodes 130 of the second liquid crystal panel 120-2 extend may be greater than 0° and equal to or less than 5° or 3°. In this example, the first angle is set at 2°, where the direction in which the lower electrodes 130 of the first liquid crystal panel 120-1 extend is inclined −1° with respect to the x direction, and the direction in which the lower electrodes 130 of the second liquid crystal panel 120-2 extend is inclined +1° with respect to the x direction. Since the lower electrodes 130 and the upper electrodes 132 are orthogonal to each other in each liquid crystal panel 120, the angle between the direction in which the upper electrodes 132 of the first liquid crystal panel 120-1 extend and the direction in which the upper electrodes 132 of the second liquid crystal panel 120-2 extend is also the first angle. Note that, when the substrate 122 and the counter substrate 124 are each square shaped, at least one of the lower electrodes 130 and the upper electrodes 132 of each of the liquid crystal panels 120 is inclined from either side of the substrate 122 and the counter substrate 124.

The lighting device is configured in this way so that the extending directions of the upper electrodes 132 are offset between two liquid crystal panels 120 and the extending directions of the lower electrode 130 are offset between two liquid crystal panels 120, by which the periodicity of the refractive index distribution of the liquid crystal greatly decreases and the generation of moiré can be more effectively suppressed.

Third Embodiment

Figure 10:
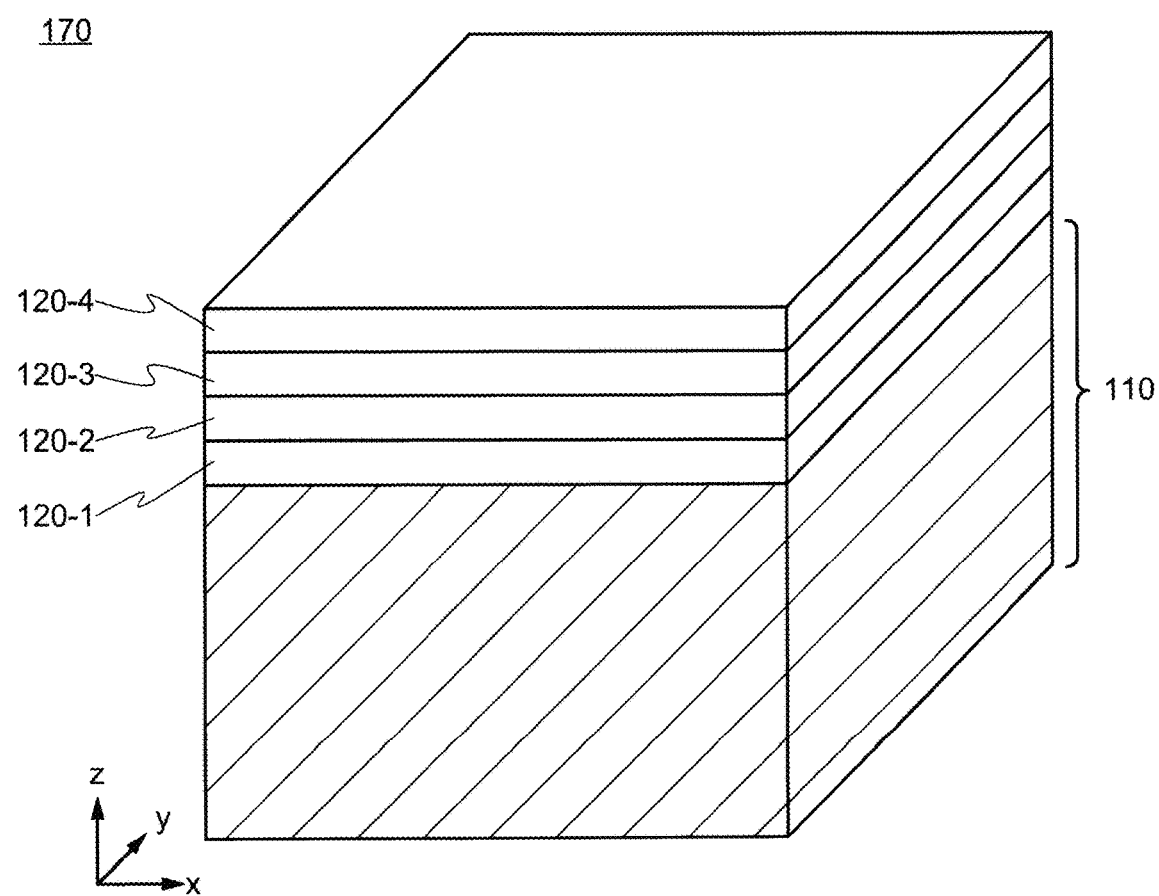
FIG. 10 is a schematic perspective view of a liquid crystal panel of a lighting device according to an embodiment of the present invention.

In this embodiment, a lighting device 170 having a different structure than the lighting device 100 is explained. An explanation of the structures the same as or similar to those described in the First and Second Embodiments may be omitted. One of the differences of the lighting device 170 from the lighting device 100 is that the lighting device 170 further includes, in addition to the first liquid crystal panel 120-1 and the second liquid crystal panel 120-2, a third liquid crystal panel 120-3 and a fourth liquid crystal panel 120-4 having the same structures as the first liquid crystal panel 120-1 and the second liquid crystal panel 120-2 (FIG. 10). The third liquid crystal panel 120-3 is arranged between the second liquid crystal panel 120-2 and the fourth liquid crystal panel 120-4.

Figure 11A:
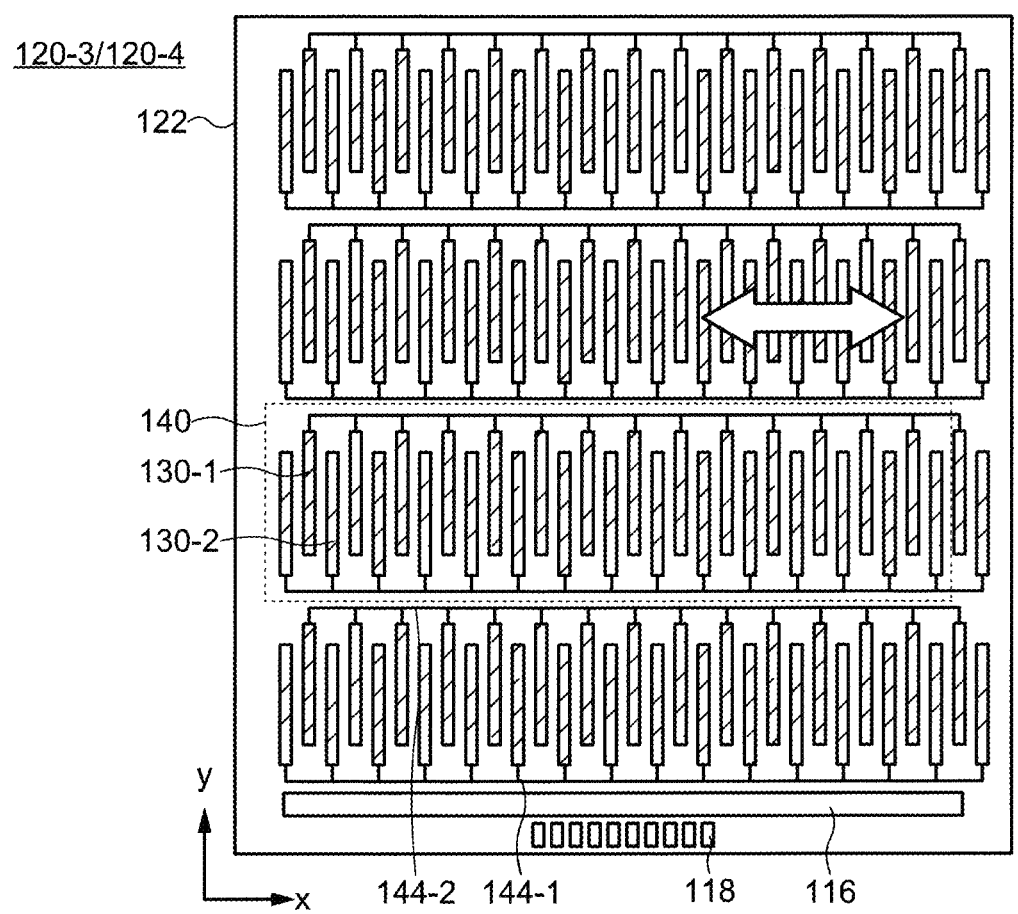
FIG. 11A is a schematic top view of a liquid crystal panel of a lighting device according to an embodiment of the present invention.
Figure 11B:
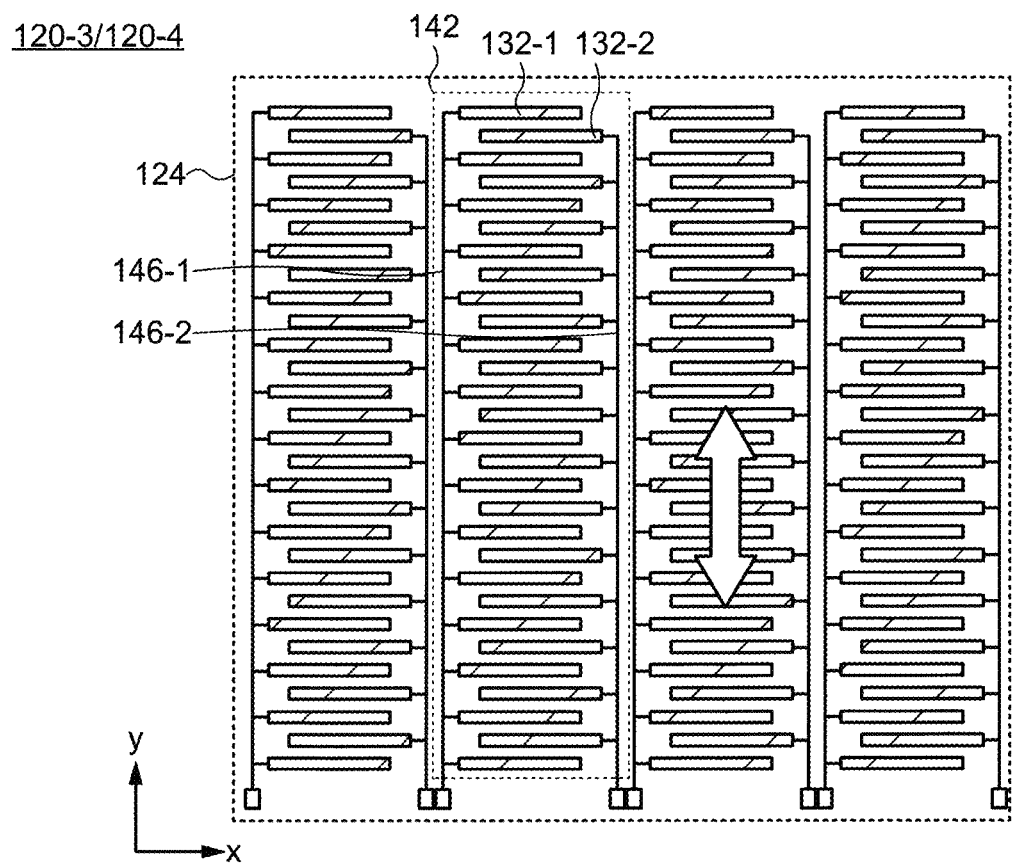
FIG. 11B is a schematic top view of a liquid crystal panel of a lighting device according to an embodiment of the present invention.

The extending directions of the lower electrodes 130 are parallel to each other, and the extending directions of the upper electrodes 132 are also parallel to each other between the third liquid crystal panel 120-3 and the fourth liquid crystal panel 120-4. However, the extending directions of the lower electrodes 130 of the third liquid crystal panel 120-3 and the fourth liquid crystal panel 120-4 are orthogonal to the extending directions of the lower electrodes 130 of the first liquid crystal panel 120-1 and the second liquid crystal panel 120-2. Similarly, the extending directions of the upper electrodes 132 of the third liquid crystal panel 120-3 and the fourth liquid crystal panel 120-4 are also orthogonal to the extending direction of the upper electrodes 132 of the first liquid crystal panel 120-1 and the second liquid crystal panel 120-4. For example, when the extending directions of the lower electrodes 130 and the upper electrodes 132 are respectively in the x direction and y direction in each of the first liquid crystal panel 120-1 and the second liquid crystal panel 120-2 (FIG. 4A and FIG. 4B), the extending directions of the lower electrodes 130 and the upper electrodes 132 are respectively in the y direction and the x direction in each of the third liquid crystal panel 120-3 and the fourth liquid crystal panel 120-4 (FIG. 11A, FIG. 11B). Furthermore, the orientation directions of the first orientation films 134 of the third liquid crystal panel 120-3 and the fourth liquid crystal panel 120-4 (see the white arrow in FIG. 11A) are also orthogonal to those of the first orientation films 134 of the first liquid crystal panel 120-1 and the second liquid crystal panel 120-2 (see white arrows in FIG. 4A). Moreover, the orientation directions of the second orientation films 136 of the third liquid crystal panel 120-3 and the fourth liquid crystal panel 120-4 (see the white arrow in FIG. 11B) are also orthogonal to those of the second orientation films 136 of the first liquid crystal panel 120-1 and the second liquid crystal panel 120-2 (see the white arrow in FIG. 4B).

Since the light can be further diffused by stacking four liquid crystal panels 120 in this manner compared to the lighting device 100 having two stacked liquid crystal panels 120, it is possible to provide a lighting device capable of illuminating a wider area. Although a detailed explanation is omitted, the third liquid crystal panel 120-3 and the fourth liquid crystal panel 120-4 are also configured so that at least one of the spacings $S_L$ of the lower electrodes 130, the widths $W_L$ of the lower electrode 130, and the pitches $P_L$ of the lower electrodes 130 varies in each lower electrode group 140. In addition, at least one of the spacings $S_U$ of the upper electrode 132, the widths $W_U$ of the upper electrode 132, and the pitches $P_L$ of the upper electrodes 132 varies in each upper electrode group 142. Therefore, moiré generation and light coloration can be effectively suppressed, and the irradiation area can be arbitrarily controlled.

Figure 12A:
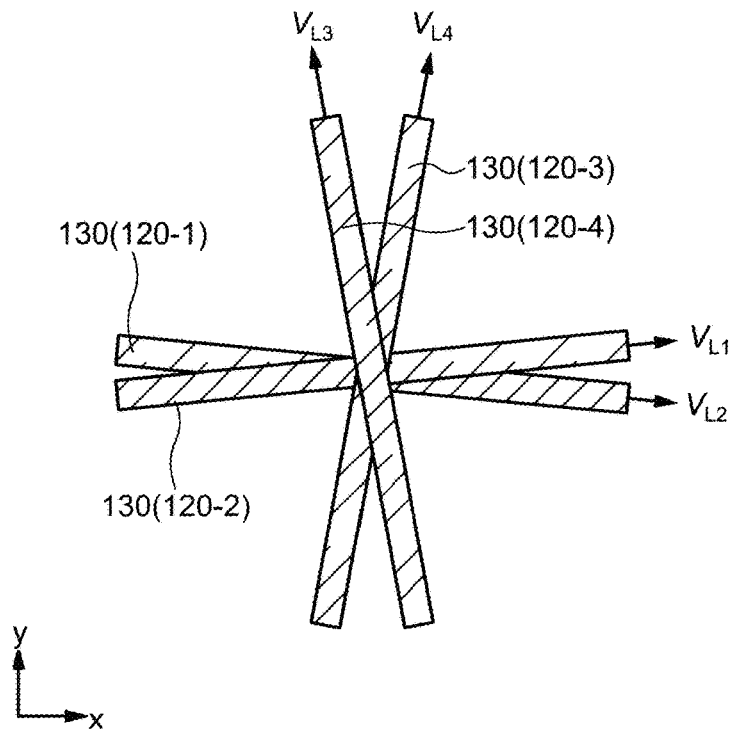
FIG. 12A is a schematic view showing an arrangement of lower electrodes in a liquid crystal panel of a lighting device according to an embodiment of the present invention.
Figure 12B:
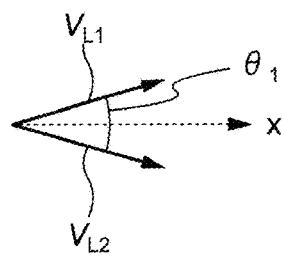
FIG. 12B is a schematic view showing an arrangement of lower electrodes in a liquid crystal panel of a lighting device according to an embodiment of the present invention.
Figure 12C:
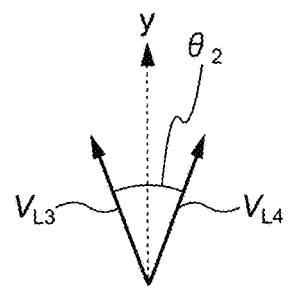
FIG. 12C is a schematic view showing an arrangement of lower electrodes in a liquid crystal panel of a lighting device according to an embodiment of the present invention.

FIG. 12A is a schematic view prepared by selecting one lower electrode 130 from each of the first liquid crystal panel 120-1 to the fourth liquid crystal panel 120-4 and stacking them in the z direction after shifting them parallel in the x direction and the y direction. Similar to the modified example of the Second Embodiment, the lighting device 170 may be configured so that the angle between the extending directions of the lower electrodes 130 $V_{L1}$ and $V_{L2}$ of the first liquid crystal panel 120-1 and the second liquid crystal panel 120-2 is the first angle $\theta_1$ (see FIG. 12B). In addition, the lower electrodes 130 of the third liquid crystal panel 120-3 and the fourth liquid crystal panel 120-4 may also be arranged so that their extending directions $V_{L3}$ and $V_{L4}$ are shifted in the lighting device 170. Assuming that the angle between the extending directions $V_{L3}$ and $V_{L4}$ is the second angle $\theta_2$ (see FIG. 12A and FIG. 12C), the first angle $\theta_1$ and the second angle $\theta_2$ may be the same as or different from each other. In the latter case, the second angle $\theta_2$ may be larger than the first angle $\theta_1$. For example, the second angle $\theta_2$ may be selected from a range greater than 0° and equal to or less than 10°. Although the explanation is omitted, the same is applied to the upper electrodes 132 orthogonal to the lower electrodes 130 in each liquid crystal panel 120. In this embodiment, the first angle $\theta_1$ is set to 2°, where the direction in which the lower electrodes 130 of the first liquid crystal panel 120-1 extend is inclined −1° with respect to the x direction, and the direction in which the lower electrodes 130 of the second liquid crystal panel 120-2 extend is inclined +1° with respect to the x direction. The second angle $\theta_2$ is set to 6°, where the direction in which the lower electrodes 130 of the third liquid crystal panel 120-3 extend is inclined −3° with respect to the y direction, and the direction in which the lower electrodes 130 of the fourth liquid crystal panel 120-4 extend is inclined +3° with respect to the y direction.

The extending directions of the lower electrodes 130 and the upper electrodes 132 are shifted between the third liquid crystal panel 120-3 and the fourth liquid crystal panel 120-4 in this way, by which moiré generation can be more effectively prevented. Here, in these four liquid crystal panels 120, the polarization components intersecting each other are optically rotated and diffused mainly by the first liquid crystal panel 120-1 and the second liquid crystal panel 120-2. Furthermore, the diffused polarization components are optically rotated and diffused again supplementally by the third liquid crystal panel 120-3 and the fourth liquid crystal panel 120-4 to reduce coloration and improve diffusivity. In light of these points, since the first angle $\theta_1$ affects the initial optical rotation and diffusion of the incident light, if the aforementioned first angle $\theta_1$ is set to be a large angle, the optical rotation and the diffusion cannot be sufficiently achieved, resulting in degradation of the quality of the emitted light. On the other hand, setting the second angle $\theta_2$ to a certain value increases the diffusivity of the outgoing light. In view of these points, the second angle $\theta_2$ is particularly set to be larger than the first angle $\theta_1$ and is set to be from 0° to 10°, more preferably from 3° to 7°, by which the diffusivity can be improved and the coloration can be suppressed while maintaining the quality of the emitted light.

Fourth Embodiment

In this embodiment, a lighting device 180 having a different structure than the lighting devices 100 and 170 is explained. An explanation of the structures the same as or similar to those described in the First to Third Embodiments may be omitted. Similar to the lighting device 170, the lighting device 180 has the first to fourth liquid crystal panels 120 stacked in sequence over the light source 110, but one of the differences of the lighting device 180 from the lighting device 170 is that one of the lower electrode 130 and the upper electrode 132 is composed of a single electrode in each liquid crystal panel 120.

Figure 13:
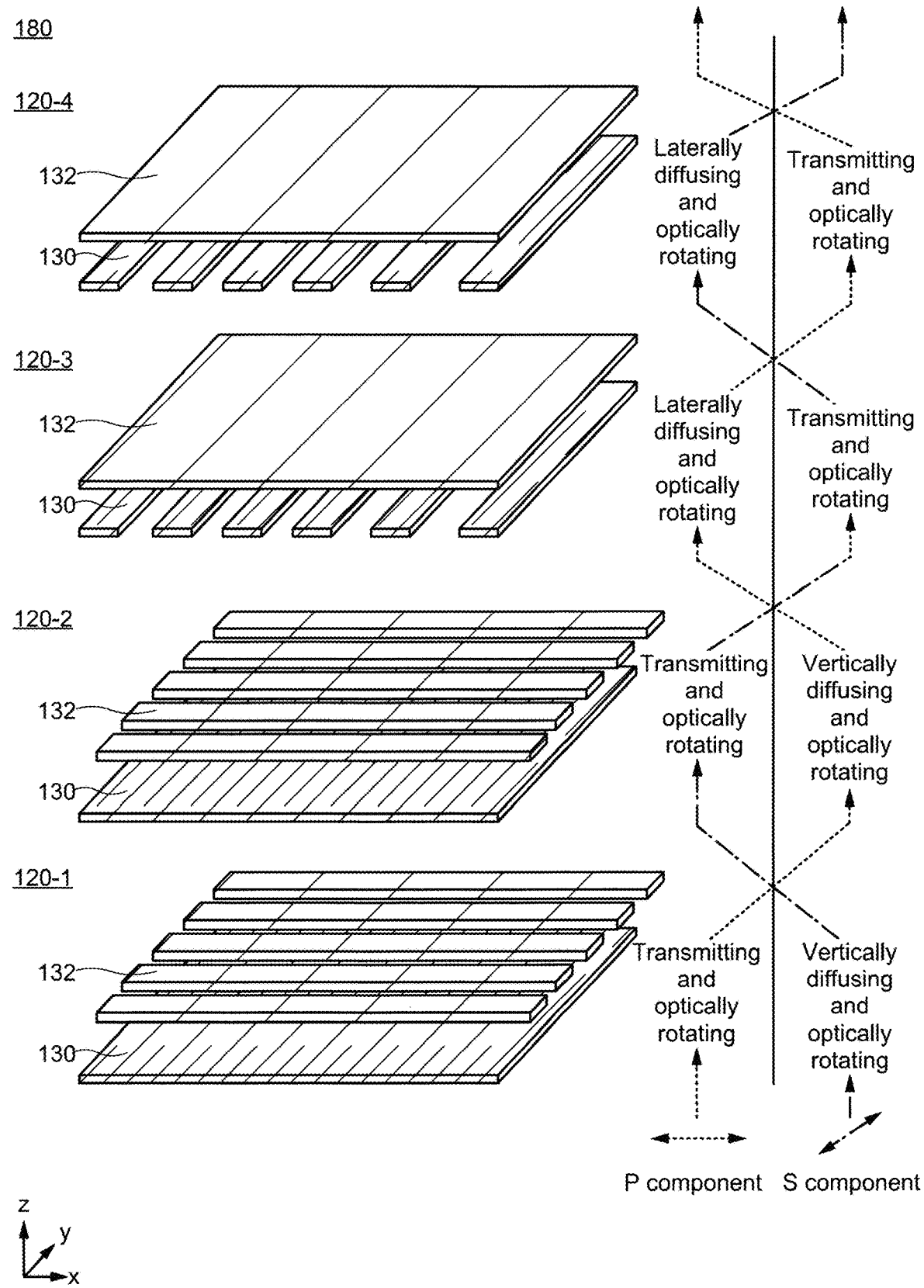
FIG. 13 is a schematic perspective view of a liquid crystal panel of a lighting device according to an embodiment of the present invention.

FIG. 13 shows a schematic perspective view of the lighting device 180. In this drawing, only a portion of the lower electrodes 130 and the upper electrodes 132 of each liquid crystal panel 120 is schematically shown for visibility. As shown in FIG. 13, the lower electrode 130 of each of the first liquid crystal panel 120-1 and the second liquid crystal panel 120-2 is composed of a single lower electrode 130 in the lighting device 180. In each of the first liquid crystal panel 120-1 and the second liquid crystal panel 120-2, the single lower electrode 130 may overlap all of the upper electrodes 132. On the other hand, the upper electrodes 132 are each composed of a single upper electrode 132 in each of the third liquid crystal panel 120-3 and the fourth liquid crystal panel 120-4. In each of the third liquid crystal panel 120-3 and the fourth liquid crystal panel 120-4, the single upper electrode 132 may also overlap all of the lower electrodes 130.

In this configuration, no refractive index distribution is generated on the lower electrode 130 side of the liquid crystal layer 138, but a refractive index distribution is generated on the top electrode 132 side in the first liquid crystal panel 120-1 and the second liquid crystal panel 120-2. Therefore, one of the components of the incident light (e.g., S-polarized component) is diffused by the first liquid crystal panel 120-1, while the other component (P-polarized component) is diffused by the second liquid crystal panel 120-2 as shown in FIG. 13. Similarly, no refractive index distribution is generated on the upper electrode 132 side of the liquid crystal layer 138, but a refractive index distribution is generated on the lower electrode 130 side in the third liquid crystal panel 120-3 and the fourth liquid crystal panel 120-4. Hence, one of the components of the incident light (P-polarized component) is diffused by the third liquid crystal panel 120-3, while the other component (S-polarized component) is diffused by the fourth liquid crystal panel 120-4.

Figure 14:
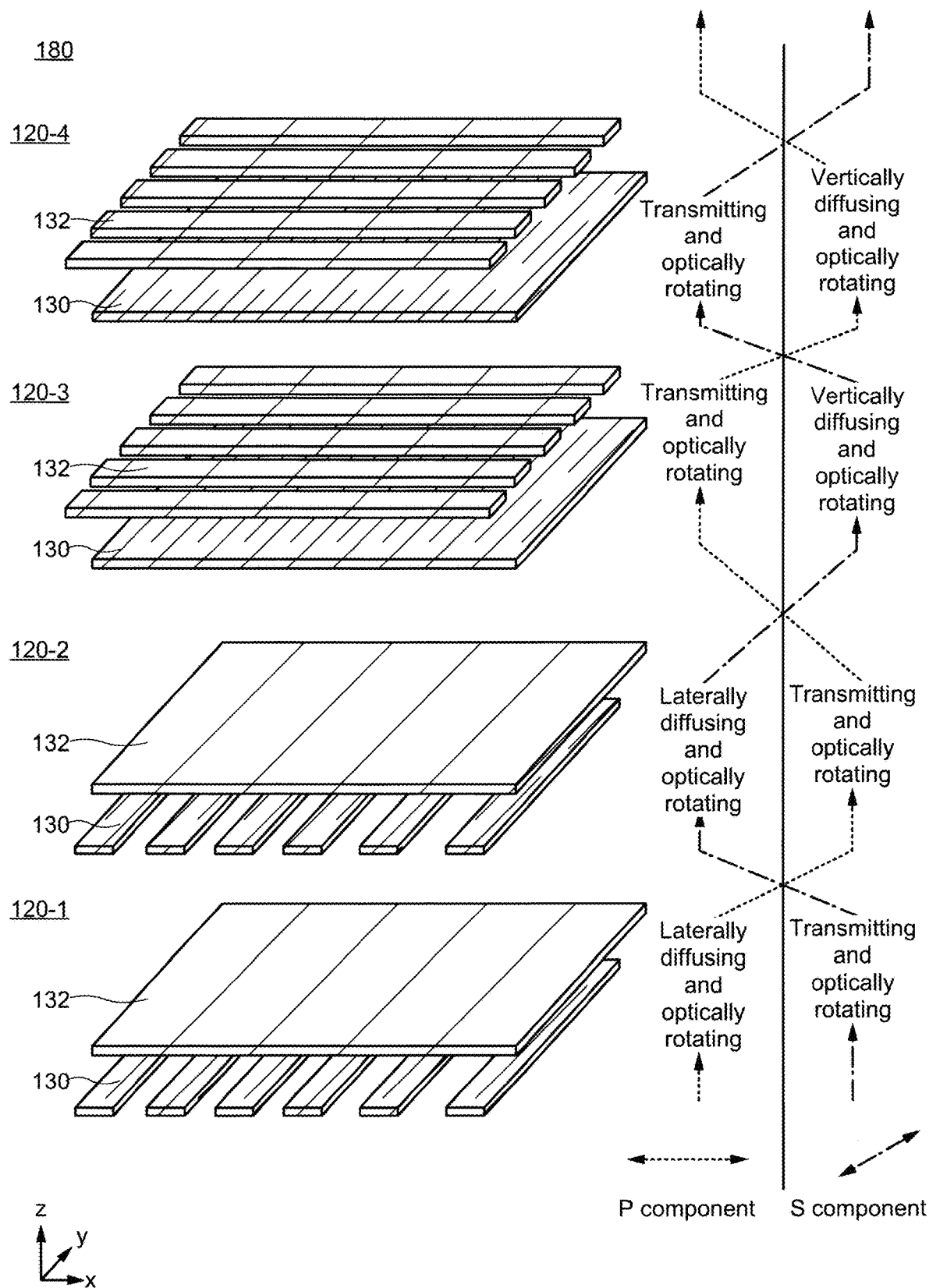
FIG. 14 is a schematic perspective view of a liquid crystal panel of a lighting device according to an embodiment of the present invention.

Note that the upper electrode 132 of each of the first liquid crystal panel 120-1 and the second liquid crystal panel 120-2 may be composed of a single upper electrode 132, and the lower electrode 130 of each of the third liquid crystal panel 120-3 and the fourth liquid crystal panel 120-4 may be composed of a single lower electrode 130 as shown in FIG. 14. In this case, the single upper electrode 132 may still overlap all of the lower electrodes 130 in each of the first liquid crystal panel 120-1 and the second liquid crystal panel 120-2, and the single lower electrode 130 may overlap all of the upper electrodes 132 in each of the third liquid crystal panel 120-3 and the fourth liquid crystal panel 120-4. In this configuration, the light diffusion similar to that shown in FIG. 13 also occurs as shown in FIG. 14.

Figure 15:
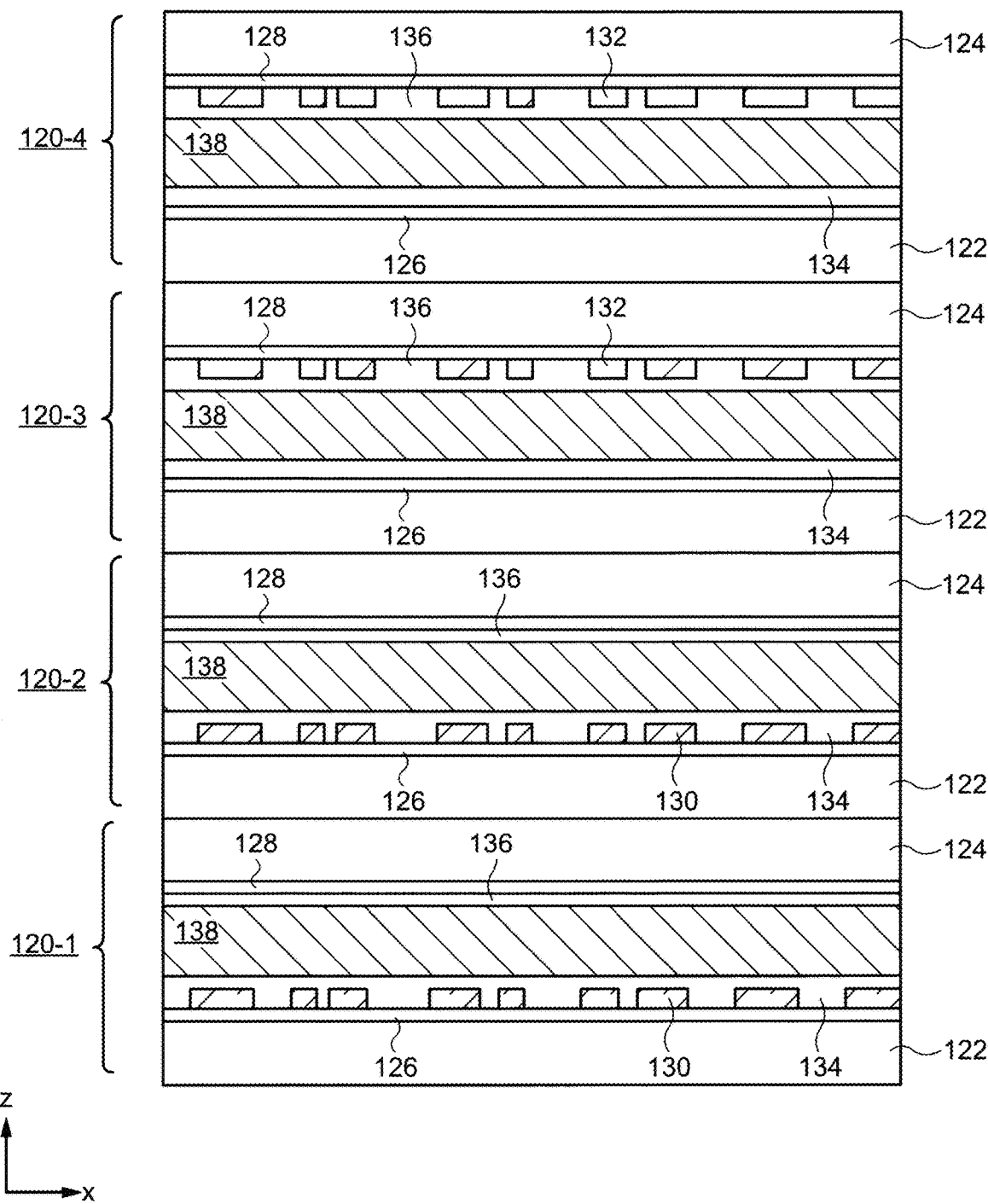
FIG. 15 is a schematic cross-sectional view of a liquid crystal panel of a lighting device according to an embodiment of the present invention.

Alternatively, no upper electrode 132 may be provided in the first liquid crystal panel 120-1 and the second liquid crystal panel 120-2, and no lower electrode 130 may be provided in the third liquid crystal panel 120-3 and the fourth liquid crystal panel 120-4 as shown in the schematic cross-sectional view in FIG. 15. In this case, the second orientation film 136 may be in direct contact with the counter substrate 124 in the first liquid crystal panel 120-1 and the second liquid crystal panel 120-2. Furthermore, the first orientation film 134 may be in direct contact with the substrate 122 in the third liquid crystal panel 120-3 and the fourth liquid crystal panel 120-4.

Figure 16:
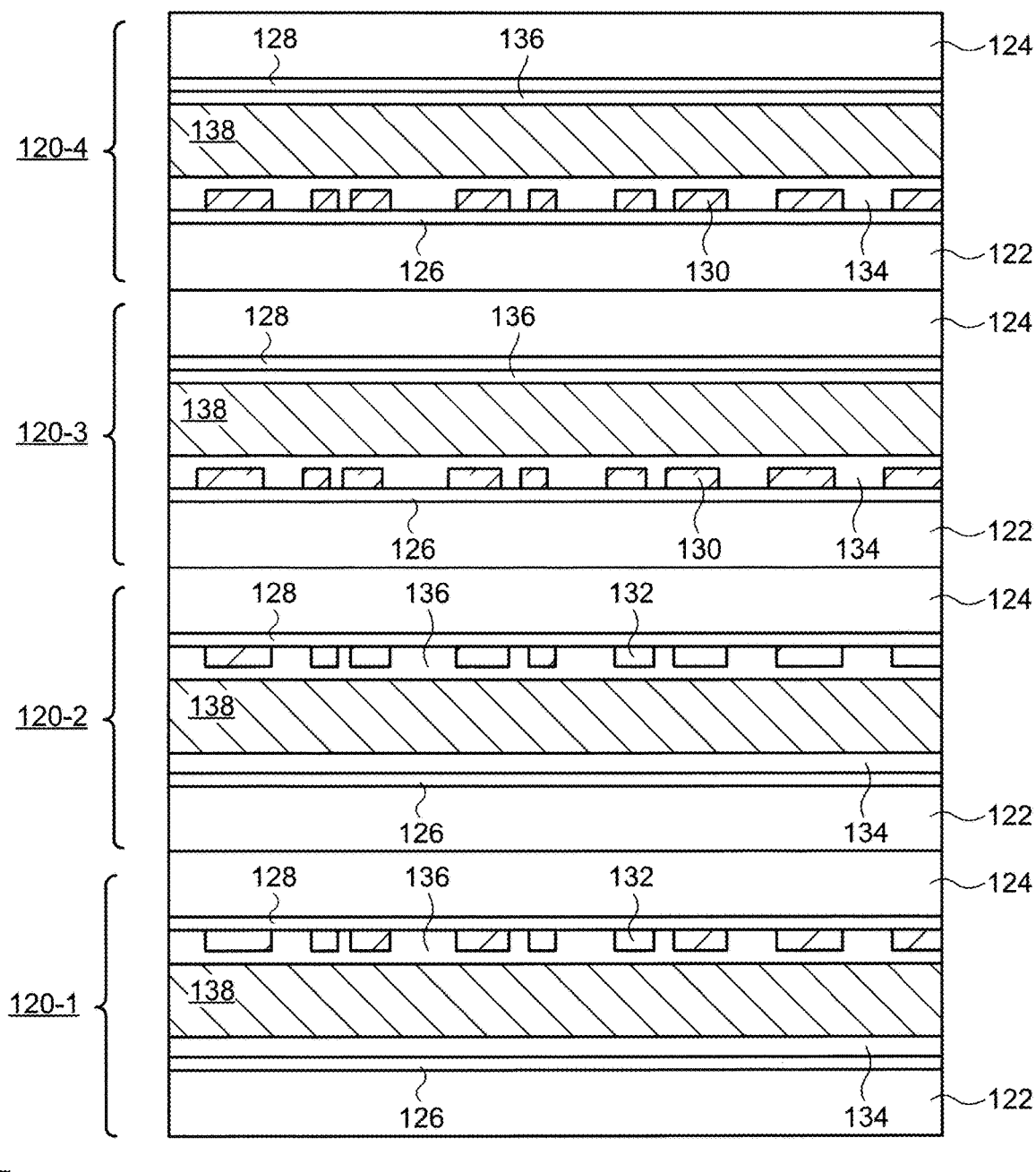
FIG. 16 is a schematic cross-sectional view of a liquid crystal panel of a lighting device according to an embodiment of the present invention.

Alternatively, no lower electrode 130 may be provided in the first liquid crystal panel 120-1 and the second liquid crystal panel 120-2, and no upper electrode 132 may be provided in the third liquid crystal panel 120-3 and the fourth liquid crystal panel 120-4 as shown in FIG. 16. In this case, the first orientation film 134 may be in direct contact with the substrate 122 in the first liquid crystal panel 120-1 and the second liquid crystal panel 120-2, and the second orientation film 136 may be in direct contact with the counter substrate 124 in the third liquid crystal panel 120-3 and the fourth liquid crystal panel 120-4.

In the lighting device 180 shown in FIG. 15 and FIG. 16, since the refractive index distribution can be generated on the lower electrode 130 side or the upper electrode 132 side of the liquid crystal layer 138 in each liquid crystal panel 120, both components of the incident light can be diffused similar to the lighting device 170. In addition, since only the lower electrode 130 side or the upper electrode 132 side needs to be driven in each liquid crystal panel 120, the thickness $T_{LC}$ of the liquid crystal layer 138 can be reduced, which contributes to the reduction of the thickness of the lighting device. Furthermore, since the number of electrodes through which the light from the light source 110 passes is halved, the light transmittance of each liquid crystal panel 120 is improved. Moreover, since the number of electrodes can be reduced, the lighting device can be provided in a shorter time and at a lower cost.

Although a detailed explanation is omitted, the plurality of lower electrodes 130 is arranged so that at least one of the spacings $S_L$, the widths $W_L$, and the pitches $P_L$ varies in each of the lower electrode groups 140, and the plurality of upper electrodes 132 is also arranged so that at least one of the spacings $S_U$, the widths $W_U$, and the pitches $P_U$ varies in each of the upper electrode groups 142 in the lighting device 180, similar to the lighting device 100. Thus, light coloration is prevented, and at the same time, moiré generation can be prevented without the use of any diffusion sheet.

EXAMPLE

In this Example, the results are demonstrated which preliminary prove that moiré generation and coloration can be suppressed by varying the spacings, the widths, or the pitches of the lower electrodes 130 and the upper electrodes 132 in the lighting device 100.

1. Experiment

The first liquid crystal panel 120-1 shown in FIG. 14 was fabricated as a liquid crystal panel. Specifically, a total of 250 lower electrodes (length: 40 mm, thickness: 77 nm) including ITO and arranged in a stripe shape were fabricated by a sputtering method on a 5 cm×5 cm glass substrate over which an undercoat including silicon oxide (thickness: 200 nm) was provided. As the counter substrate, a 5 cm×5 cm glass substrate with an overcoat (thickness: 200 nm) containing silicon oxide was used. As the upper electrode, a single ITO electrode (40 mm×40 mm, thickness: 77 nm) overlapping the lower electrodes was formed over the overcoat of the counter substrate using a sputtering method. The substrate and the counter substrate were fixed using a sealing material containing a light-curing resin, and TN liquid crystals were injected therebetween. A total of five liquid crystal panels were fabricated by varying the widths of the lower electrode from 5 μm to 11 μm, the spacings from 5 μm to 15 μm, and the pitches from 10 μm to 20 μm in the liquid crystal panel. The coefficients of variation for these liquid crystal panels are shown in Table 1.

TABLE 1

Coefficient of variation of widths, spacings, and pitches of lower electrodes of liquid crystal panel.

| Panel No. | Coefficient of variation | | |
|---|---|---|---|
| | Widths | Spacings | Pitches |
| 1 | 0.00 | 0.00 | 0.00 |
| 2 | 0 | 2.86 | 2.86 |
| 3 | 1.93 | 2.03 | 3.02 |
| 4 | 1.38 | 1.65 | 1.89 |
| 5 | 1.18 | 2.10 | 1.57 |

An AC voltage of ±15 V (frequency: 60 Hz) was applied to invert the phase between adjacent lower electrodes of the fabricated liquid crystal panels, while irradiating the liquid crystal panels with white light in this state. The irradiated surface formed on white paper by the light passing through the liquid crystal panel was observed.

2. Results and Discussion

Photographs of the irradiated surfaces are shown in FIG. 17A to FIG. 17E. As shown in these drawings, since the transverse electric field is generated only on the lower electrode side in the fabricated liquid crystal panels, the light diffuses in only one direction. However, it is sufficient to verify the effects of variations in the spacings, the widths, and the pitches of the lower electrodes on coloration and moiré generation.

Figure 17A:
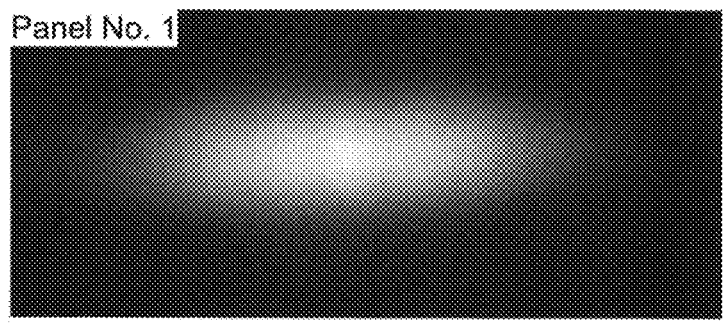
FIG. 17A is a photograph of an irradiated surface obtained by a lighting device of an Example.
Figure 17B:
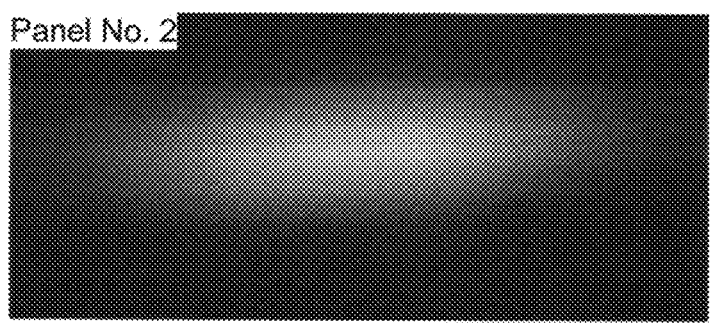
FIG. 17B is a photograph of an irradiated surface obtained by a lighting device of an Example.
Figure 17C:
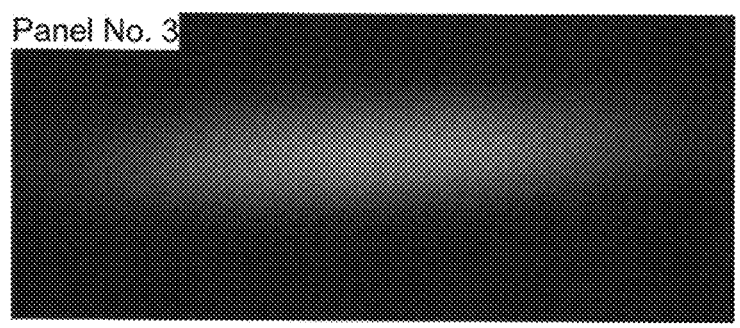
FIG. 17C is a photograph of an irradiated surface obtained by a lighting device of an Example.
Figure 17D:
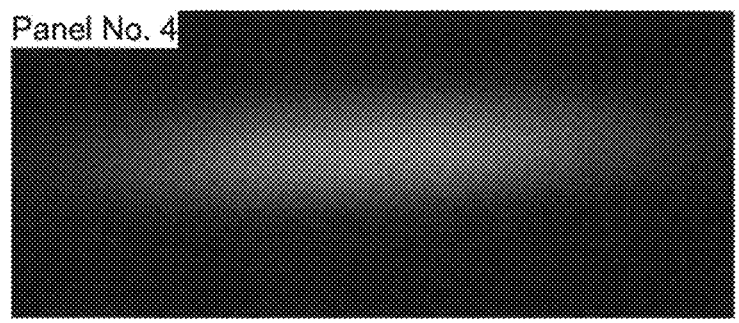
FIG. 17D is a photograph of an irradiated surface obtained by a lighting device of an Example.
Figure 17E:
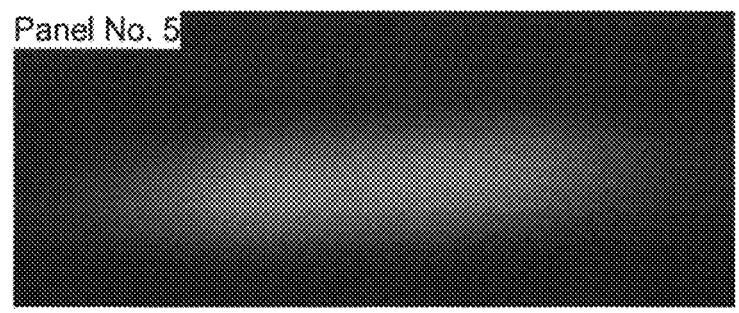
FIG. 17E is a photograph of an irradiated surface obtained by a lighting device of an Example.

As shown in FIG. 17A, in the case of the panel No. 1, which is a comparative example with no variation in the spacings, the widths, and the pitches of the lower electrodes, light coloration was clearly observed and moiré was also clearly confirmed. In contrast, in the case of the panel No. 2, in which the widths are fixed (coefficient of variation is 0.00) while the spacings and the pitches are varied, although a slight coloration was observed, moiré was hardly confirmed. Furthermore, in the panels No. 3 to No. 5, in which the widths, the spacings, and the pitches were all varied, neither coloration nor moiré was observed. The above results indicate that the light coloration and the moiré generation can be effectively suppressed by providing variation in at least one of the widths, the spacings, and the pitches of the plurality of lower electrodes arranged in a stripe shape. Although the effects of variation in the widths, the spacings, and the pitches of the upper electrodes were not examined in this example, it is readily expected that similar results can be obtained.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process on the basis of the lighting device of each embodiment is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A lighting device comprising:
a light source;
a first liquid crystal panel over the light source;
a second liquid crystal panel over the first liquid crystal panel;
a third liquid crystal panel over the second liquid crystal panel; and
a fourth liquid crystal panel over the third liquid crystal panel,
wherein each of the first liquid crystal panel and the second liquid crystal panel comprises:
a substrate;
a plurality of lower electrodes arranged over the substrate in a stripe shape;
a first orientation film over the plurality of lower electrodes;
a liquid crystal layer over the first orientation film;
a second orientation film arranged over the liquid crystal layer and having an orientation direction orthogonal to that of the first orientation film;
a plurality of upper electrodes arranged over the second orientation film, orthogonal to the plurality of lower electrodes, and arranged in a stripe shape; and
a counter substrate over the plurality of upper electrodes,
wherein a first angle between an extending direction of the plurality of lower electrodes of the first liquid crystal panel and an extending direction of the plurality of lower electrodes of the second liquid crystal panel is equal to or greater than 0° and equal to or less than 5°, and
wherein, in each of the first liquid crystal panel and the second liquid crystal panel,
with respect to sequentially arranged first to third lower electrodes arbitrarily selected from the plurality of lower electrodes, a spacing between the first lower electrode and the second lower electrode is different from a spacing between the second lower electrode and the third lower electrode, and
with respect to sequentially arranged first to third upper electrodes arbitrarily selected from the plurality of upper electrodes, a spacing between the first upper electrode and the second upper electrode is different from a spacing between the second upper electrode and the third upper electrode,
wherein the third liquid crystal panel and the fourth liquid crystal panel each have the same structure as the first liquid crystal panel or the second liquid crystal panel, and
an extending direction of the plurality of lower electrodes of the third liquid crystal panel and an extending direction of the plurality of lower electrodes of the fourth liquid crystal panel are each orthogonal to the extending direction of the plurality of lower electrodes of the first liquid crystal panel.

2. The lighting device according to claim 1, wherein, in each of the first liquid crystal panel and the second liquid crystal panel,
the first to third lower electrodes have different widths from one another, and
the first to third upper electrodes have different widths from one another.

3. The lighting device according to claim 1, wherein, in each of the first liquid crystal panel and the second liquid crystal panel,
a pitch between the first lower electrode and the second lower electrode is different from a pitch between the second lower electrode and the third lower electrode, and a pitch between the first upper electrode and the second upper electrode is different from a pitch between the second upper electrode and the third upper electrode.

4. The lighting device according to claim 1,
wherein the first angle is greater than 0° and equal to or less than 5°.

5. The lighting device according to claim 1,
wherein a second angle between the extending direction of the plurality of lower electrodes of the third liquid crystal panel and the extending direction of the plurality of lower electrodes of the fourth liquid crystal panel is equal to or greater than 0° and equal to or less than 10°.

6. The lighting device according to claim 5,
wherein the second angle is greater than the first angle.

7. A lighting device comprising:
a light source; and
first to fourth liquid crystal panels sequentially stacked over the light source,
wherein each of the first liquid crystal panel and the second liquid crystal panel comprises:
  a substrate;
  a plurality of lower electrodes arranged over the substrate in a stripe shape;
  a first orientation film arranged over the plurality of lower electrodes;
  a liquid crystal layer over the first orientation film;
  a second orientation film arranged over the liquid crystal layer and having an orientation direction orthogonal to that of the first orientation film; and
  a counter substrate over the second orientation film,
wherein each of the third liquid crystal panel and the fourth liquid crystal panel comprises:
  a substrate;
  a first orientation film over the substrate;
  a liquid crystal layer over the first orientation film;
  a second orientation film arranged over the liquid crystal layer and having an orientation direction orthogonal to that of the first orientation film;
  a plurality of upper electrodes arranged over the second orientation film in a stripe shape; and
  a counter substrate over the plurality of upper electrodes,
wherein extending directions of the plurality of lower electrodes of the first liquid crystal panel and the second liquid crystal panel are orthogonal to extending directions of the plurality of upper electrodes of the third liquid crystal panel and the fourth liquid crystal panel,
wherein, with respect to sequentially arranged first to third lower electrodes arbitrarily selected from the plurality of lower electrodes in each of the first liquid crystal panel and the second liquid crystal panel, a spacing between the first lower electrode and the second lower electrode is different from a spacing between the second lower electrode and the third lower electrode,
wherein, with respect to sequentially arranged first to third upper electrodes arbitrarily selected from the plurality of upper electrodes in each of the third liquid crystal panel and the fourth liquid crystal panel, a spacing between the first upper electrode and the second upper electrode is different from a spacing between the second upper electrode and the third upper electrode, and
wherein at least one of the first liquid crystal panel and the second liquid crystal panel further comprises a single upper electrode overlapping the plurality of lower electrodes between the second orientation film and the counter substrate.

8. The lighting device according to claim 7,
wherein the first to third lower electrodes have different widths from one another in the first liquid crystal panel and the second liquid crystal panel, and
wherein the first to third upper electrodes have different widths from one another in each of the third liquid crystal panel and the fourth liquid crystal panel.

9. The lighting device according to claim 7,
wherein a pitch between the first lower electrode and the second lower electrode is different from a pitch between the second lower electrode and the third lower electrode in each of the first liquid crystal panel and the second liquid crystal panel, and
wherein a pitch between the first upper electrode and the second upper electrode is different from a pitch between the second upper electrode and the upper lower electrode in each of the third liquid crystal panel and the fourth liquid crystal panel.

10. The lighting device according to claim 7,
wherein at least one of the third liquid crystal panel and the fourth liquid crystal panel further comprises a single lower electrode overlapping the plurality of upper electrodes between the substrate and the first orientation film.

11. A lighting device comprising:
a light source; and
first to fourth liquid crystal panels sequentially stacked over the light source,
wherein each of the first liquid crystal panel and the second liquid crystal panel comprises:
  a substrate;
  a first orientation film arranged over the substrate;
  a liquid crystal layer arranged over the first orientation film;
  a second orientation film arranged over the liquid crystal layer and having an orientation direction orthogonal to that of the first orientation film;
  a plurality of upper electrodes arranged over the second orientation film in a stripe shape; and
  a counter substrate over the plurality of upper electrodes,
wherein each of the third liquid crystal panel and the fourth liquid crystal panel comprises;
  a substrate;
  a plurality of lower electrodes arranged over the substrate in a stripe shape;
  a first orientation film arranged over the plurality of lower electrodes;
  a liquid crystal layer arranged over the first orientation film;
  a second orientation film arranged over the liquid crystal layer and having an orientation direction orthogonal to that of the first orientation film; and
  a counter substrate over the second orientation film,
wherein extending directions of the plurality of upper electrodes of the first liquid crystal panel and the second liquid crystal panel are orthogonal to extending directions of the plurality of lower electrodes of the third liquid crystal panel and the fourth liquid crystal panel,
wherein, with respect to sequentially arranged first to third upper electrodes arbitrarily selected from the plurality of upper electrodes in each of the first liquid crystal panel and the second liquid crystal panel, a spacing between the first upper electrode and the second upper electrode is different from a spacing between the second upper electrode and the third upper electrode, wherein, with respect to sequentially arranged first to third lower electrodes arbitrarily selected from the plurality of lower electrodes in each of the third liquid crystal panel and the fourth liquid crystal panel, a spacing between the first lower electrode and the second lower electrode is different from a spacing between the second lower electrode and the third lower electrode, and wherein at least one of the first liquid crystal panel and the second liquid crystal panel further comprises a single lower electrode overlapping the plurality of upper electrodes between the substrate and the first orientation film.

12. The lighting device according to claim 11,
wherein the first to third upper electrodes have different widths from one another in each of the first liquid crystal panel and the second liquid crystal panel, and
wherein the first to third lower electrodes have different widths from one another in each of the third liquid crystal panel and the fourth liquid crystal panel.

13. The lighting device according to claim 11,
wherein a pitch between the first upper electrode and the second upper electrode is different from a pitch between the second upper electrode and the third upper electrode in each of the first liquid crystal panel and the second liquid crystal panel, and
wherein a pitch between the first lower electrode and the second lower electrode is different from a pitch between the second lower electrode and the third lower electrode in each of the third liquid crystal panel and the fourth liquid crystal panel.

14. The lighting device according to claim 11,
wherein at least one of the third liquid crystal panel and the fourth liquid crystal panel further comprises a single upper electrode overlapping the plurality of lower electrodes between the second orientation film and the counter substrate.

15. A lighting device comprising:
a light source; and
first to fourth liquid crystal panels sequentially stacked over the light source,
wherein each of the first liquid crystal panel and the second liquid crystal panel comprises:
a substrate;
a plurality of lower electrodes arranged over the substrate in a stripe shape;
a first orientation film arranged over the plurality of lower electrodes;
a liquid crystal layer over the first orientation film;
a second orientation film arranged over the liquid crystal layer and having an orientation direction orthogonal to that of the first orientation film; and
a counter substrate over the second orientation film,
wherein each of the third liquid crystal panel and the fourth liquid crystal panel comprises:
a substrate;
a first orientation film over the substrate;
a liquid crystal layer over the first orientation film;
a second orientation film arranged over the liquid crystal layer and having an orientation direction orthogonal to that of the first orientation film;
a plurality of upper electrodes arranged over the second orientation film in a stripe shape; and
a counter substrate over the plurality of upper electrodes, wherein extending directions of the plurality of lower electrodes of the first liquid crystal panel and the second liquid crystal panel are orthogonal to extending directions of the plurality of upper electrodes of the third liquid crystal panel and the fourth liquid crystal panel, wherein, with respect to sequentially arranged first to third lower electrodes arbitrarily selected from the plurality of lower electrodes in each of the first liquid crystal panel and the second liquid crystal panel, a spacing between the first lower electrode and the second lower electrode is different from a spacing between the second lower electrode and the third lower electrode, wherein, with respect to sequentially arranged first to third upper electrodes arbitrarily selected from the plurality of upper electrodes in each of the third liquid crystal panel and the fourth liquid crystal panel, a spacing between the first upper electrode and the second upper electrode is different from a spacing between the second upper electrode and the third upper electrode, and wherein at least one of the third liquid crystal panel and the fourth liquid crystal panel further comprises a single lower electrode overlapping the plurality of upper electrodes between the substrate and the first orientation film.

16. The lighting device according to claim 15,
wherein the first to third lower electrodes have different widths from one another in the first liquid crystal panel and the second liquid crystal panel, and
wherein the first to third upper electrodes have different widths from one another in each of the third liquid crystal panel and the fourth liquid crystal panel.

17. The lighting device according to claim 15,
wherein a pitch between the first lower electrode and the second lower electrode is different from a pitch between the second lower electrode and the third lower electrode in each of the first liquid crystal panel and the second liquid crystal panel, and
wherein a pitch between the first upper electrode and the second upper electrode is different from a pitch between the second upper electrode and the upper lower electrode in each of the third liquid crystal panel and the fourth liquid crystal panel.

18. A lighting device comprising:
a light source; and
first to fourth liquid crystal panels sequentially stacked over the light source,
wherein each of the first liquid crystal panel and the second liquid crystal panel comprises:
a substrate;
a first orientation film arranged over the substrate;
a liquid crystal layer arranged over the first orientation film;
a second orientation film arranged over the liquid crystal layer and having an orientation direction orthogonal to that of the first orientation film;
a plurality of upper electrodes arranged over the second orientation film in a stripe shape; and
a counter substrate over the plurality of upper electrodes,
wherein each of the third liquid crystal panel and the fourth liquid crystal panel comprises:
a substrate;

a plurality of lower electrodes arranged over the substrate in a stripe shape;

a first orientation film arranged over the plurality of lower electrodes;

a liquid crystal layer arranged over the first orientation film;

a second orientation film arranged over the liquid crystal layer and having an orientation direction orthogonal to that of the first orientation film; and a counter substrate over the second orientation film, wherein extending directions of the plurality of upper electrodes of the first liquid crystal panel and the second liquid crystal panel are orthogonal to extending directions of the plurality of lower electrodes of the third liquid crystal panel and the fourth liquid crystal panel, wherein, with respect to sequentially arranged first to third upper electrodes arbitrarily selected from the plurality of upper electrodes in each of the first liquid crystal panel and the second liquid crystal panel, a spacing between the first upper electrode and the second upper electrode is different from a spacing between the second upper electrode and the third upper electrode, wherein, with respect to sequentially arranged first to third lower electrodes arbitrarily selected from the plurality of lower electrodes in each of the third liquid crystal panel and the fourth liquid crystal panel, a spacing between the first lower electrode and the second lower electrode is different from a spacing between the second lower electrode and the third lower electrode, and wherein at least one of the third liquid crystal panel and the fourth liquid crystal panel further comprises a single upper electrode overlapping the plurality of lower electrodes between the second orientation film and the counter substrate.

19. The lighting device according to claim 18, wherein the first to third upper electrodes have different widths from one another in each of the first liquid crystal panel and the second liquid crystal panel, and wherein the first to third lower electrodes have different widths from one another in each of the third liquid crystal panel and the fourth liquid crystal panel.

20. The lighting device according to claim 18, wherein a pitch between the first upper electrode and the second upper electrode is different from a pitch between the second upper electrode and the third upper electrode in each of the first liquid crystal panel and the second liquid crystal panel, and wherein a pitch between the first lower electrode and the second lower electrode is different from a pitch between the second lower electrode and the third lower electrode in each of the third liquid crystal panel and the fourth liquid crystal panel.

* * * * *